(12) United States Patent
Matsusaka

(10) Patent No.: US 7,173,771 B2
(45) Date of Patent: Feb. 6, 2007

(54) VARIABLE POWER OPTICAL SYSTEM, IMAGE PICKUP LENS DEVICE, AND DIGITAL DEVICE

(75) Inventor: Keiji Matsusaka, Osaka (JP)

(73) Assignee: Konica Minolta Opto, Inc., Tokyo (JP)

( * ) Notice: Subject to any disclaimer, the term of this patent is extended or adjusted under 35 U.S.C. 154(b) by 0 days.

(21) Appl. No.: 11/130,495

(22) Filed: May 17, 2005

(65) Prior Publication Data

US 2005/0259333 A1    Nov. 24, 2005

(30) Foreign Application Priority Data

May 21, 2004    (JP) ............................. 2004-152075

(51) Int. Cl.
*G02B 15/14* (2006.01)
(52) U.S. Cl. .................................... 359/689
(58) Field of Classification Search ............... 359/676, 359/686, 689
See application file for complete search history.

(56) References Cited

U.S. PATENT DOCUMENTS 5,009,491 A    4/1991    Hata ........................... 359/689
5,798,871 A *  8/1998    Shibayama et al. ......... 359/684
6,349,002 B1   2/2002    Shibayama et al. ......... 359/689
6,816,320 B2* 11/2004    Wada .......................... 359/683
2002/0027721 A1* 3/2002  Mihara ....................... 359/686

FOREIGN PATENT DOCUMENTS

JP    07-306362    11/1995

\* cited by examiner

Primary Examiner—Scott J. Sugarman
Assistant Examiner—Darryl J. Collins
(74) Attorney, Agent, or Firm—Brinks Hofer Gilson & Lione

(57) ABSTRACT

Three or more lens groups including a negative first lens group and a positive second lens group in this order from an object side are provided. The first lens group is composed of two or more lenses. At least three lens groups are composed of single lens elements, namely, only a single lens, a cemented lens, or a lens in which adjacent lenses are integrated with each other in a fixed manner. This variable power optical system has a power ratio of about two to three, and is compact and high-definition.

25 Claims, 22 Drawing Sheets

Embodiment 1

Embodiment 2

Embodiment 3,5,6,9

Embodiment 4,8

Embodiment 7

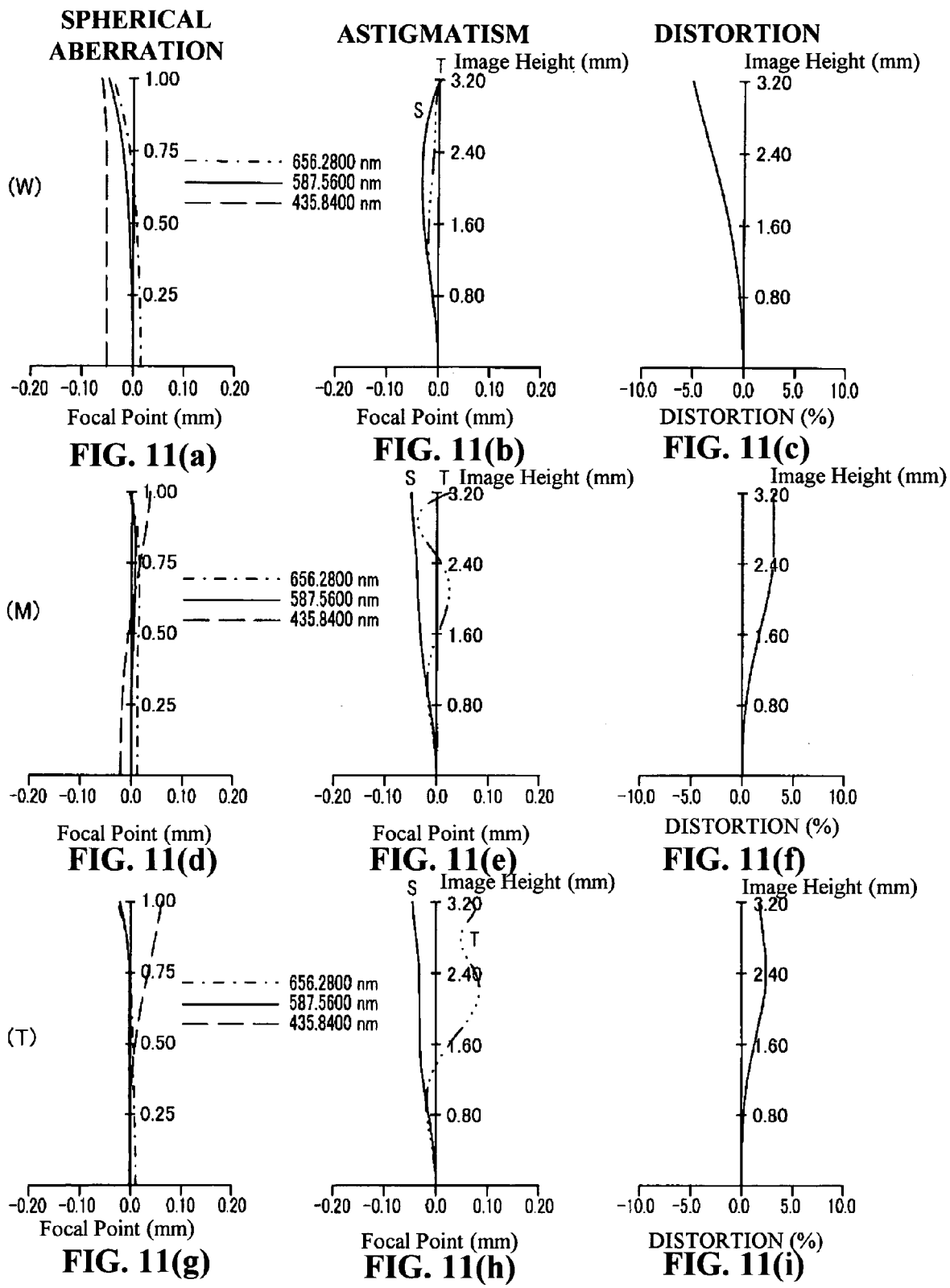

| SPHERICAL ABERRATION | ASTIGMATISM | DISTORTION |
|---|---|---|

(W)

(M)

(T)

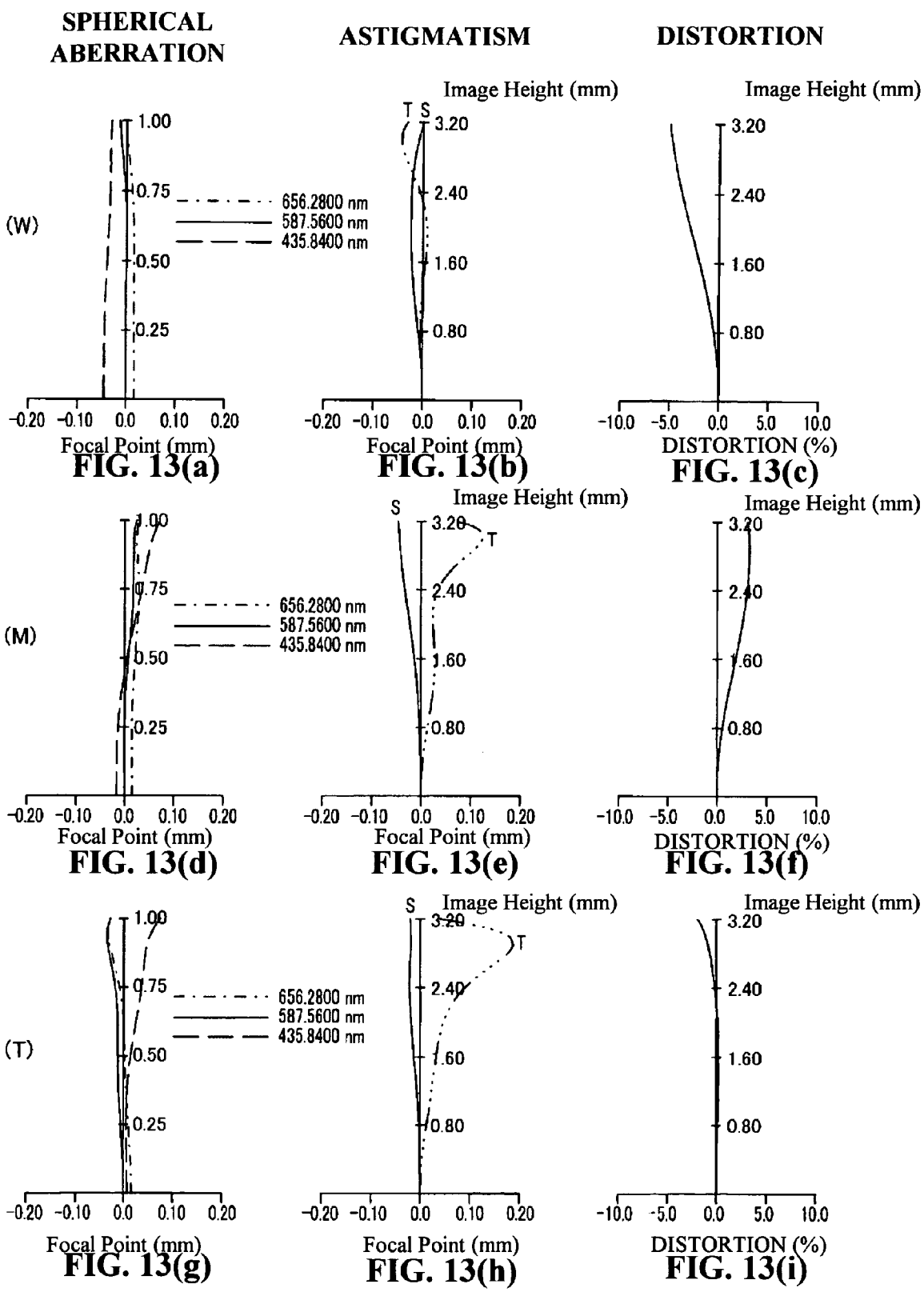

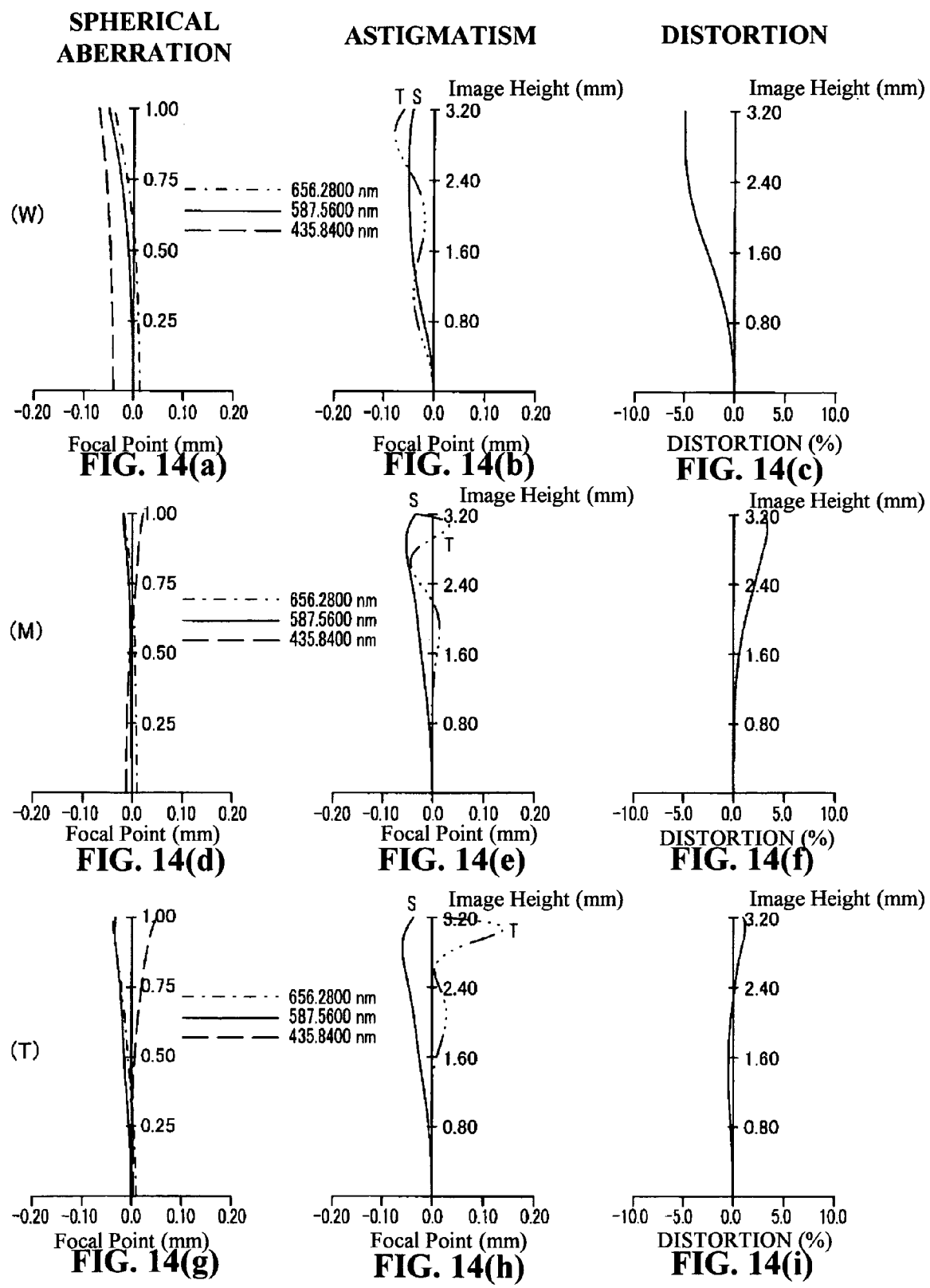

| SPHERICAL ABERRATION | ASTIGMATISM | DISTORTION |
|---|---|---|
| 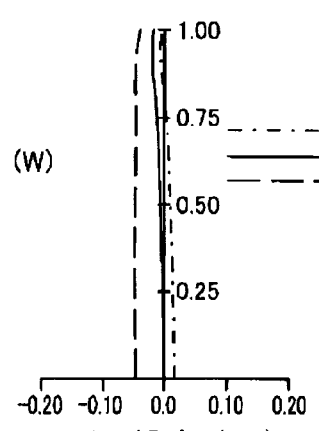 FIG. 15(a) | 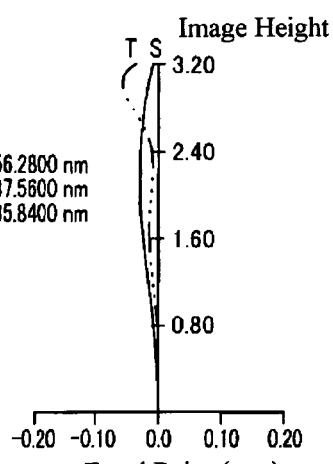 FIG. 15(b) | 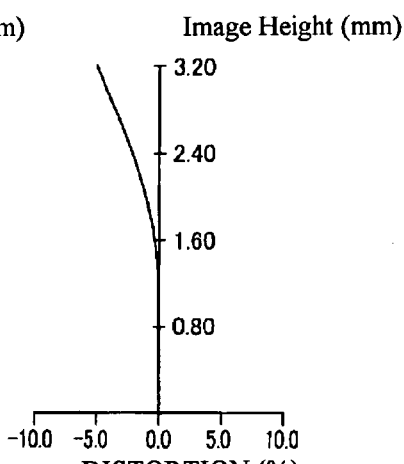 FIG. 15(c) |
| 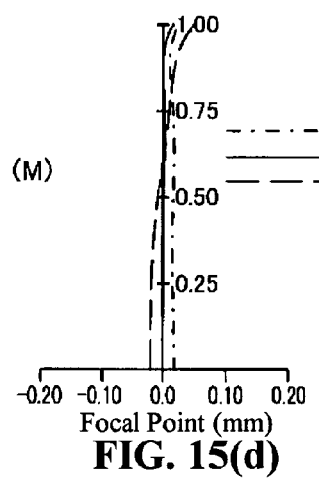 FIG. 15(d) | 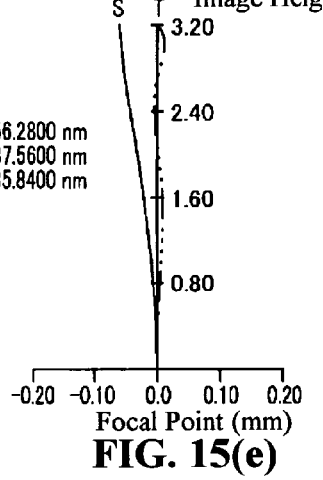 FIG. 15(e) | 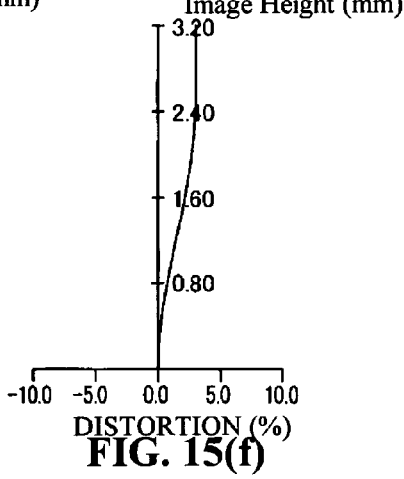 FIG. 15(f) |
| 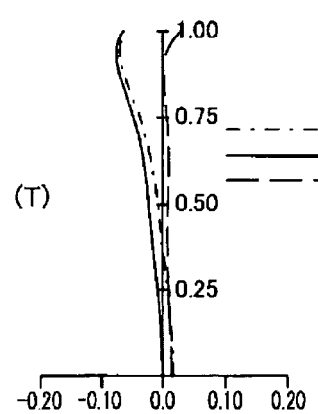 FIG. 15(g) | 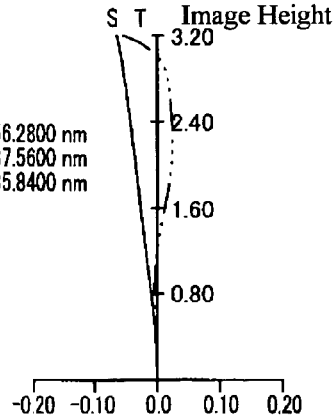 FIG. 15(h) | 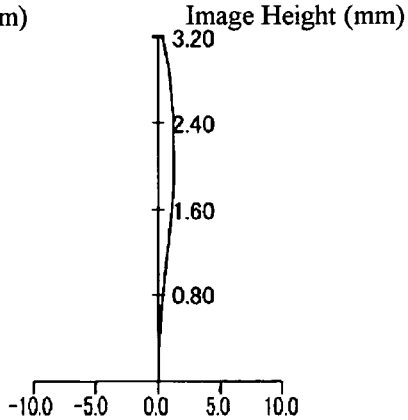 FIG. 15(i) |

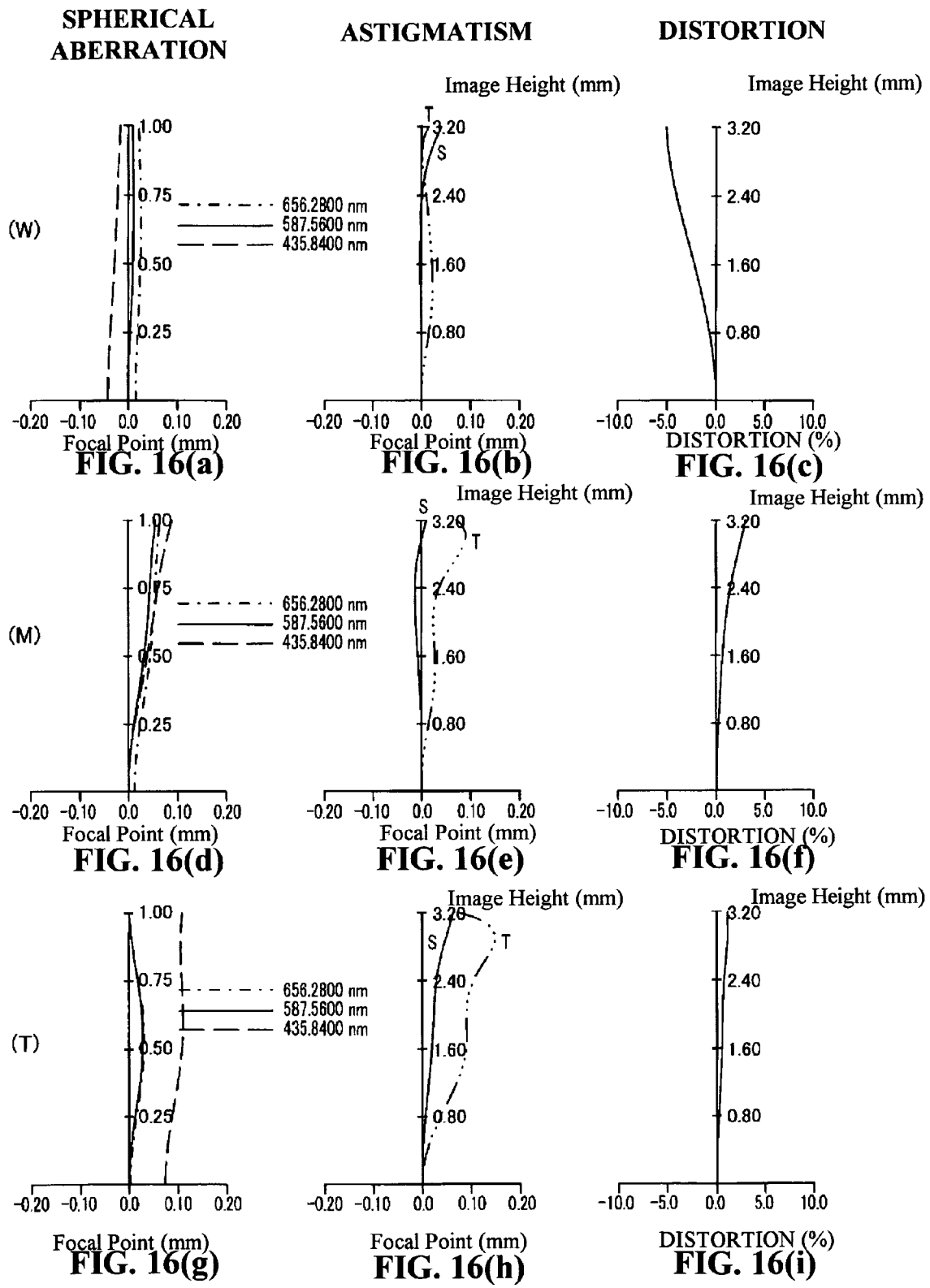

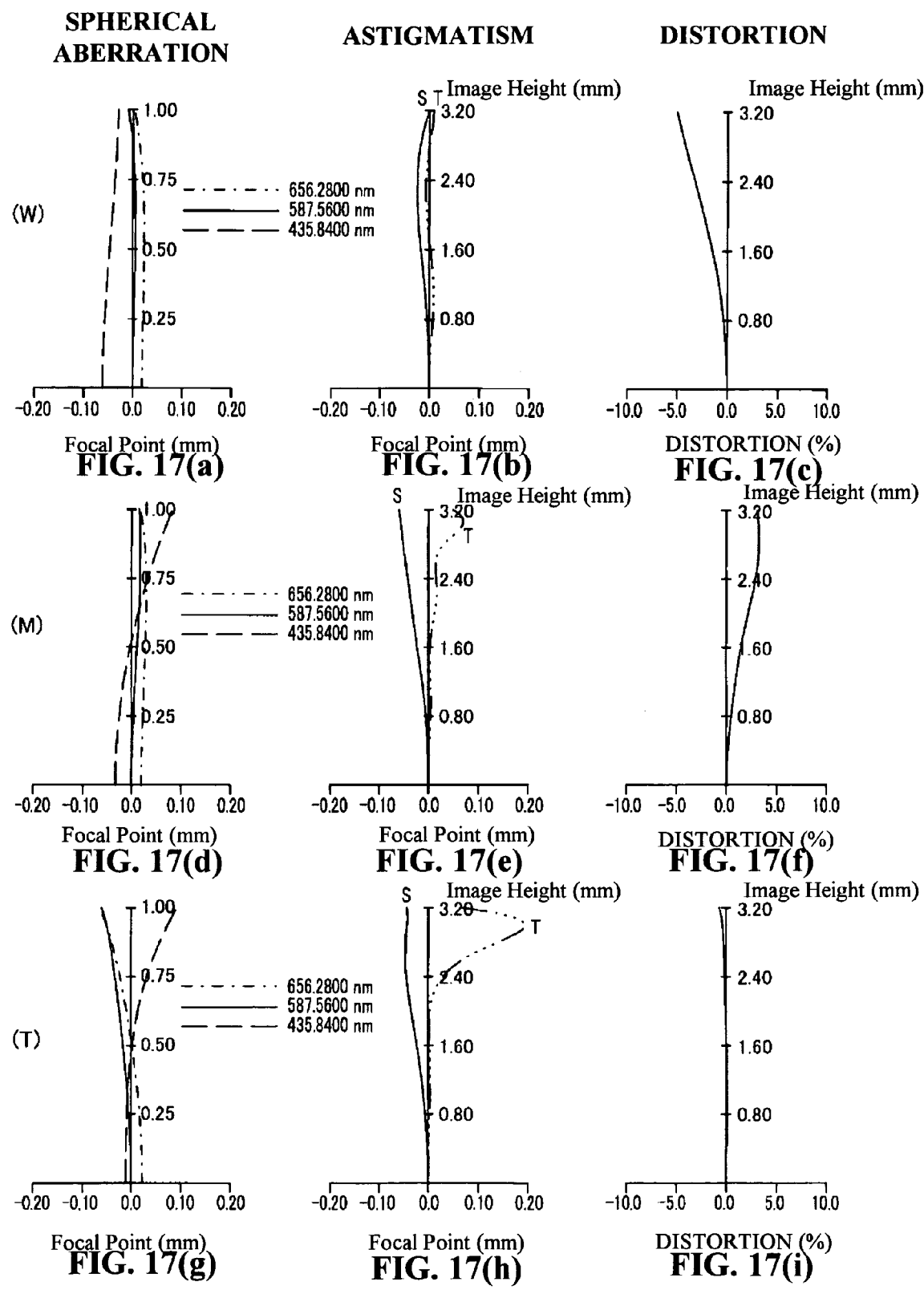

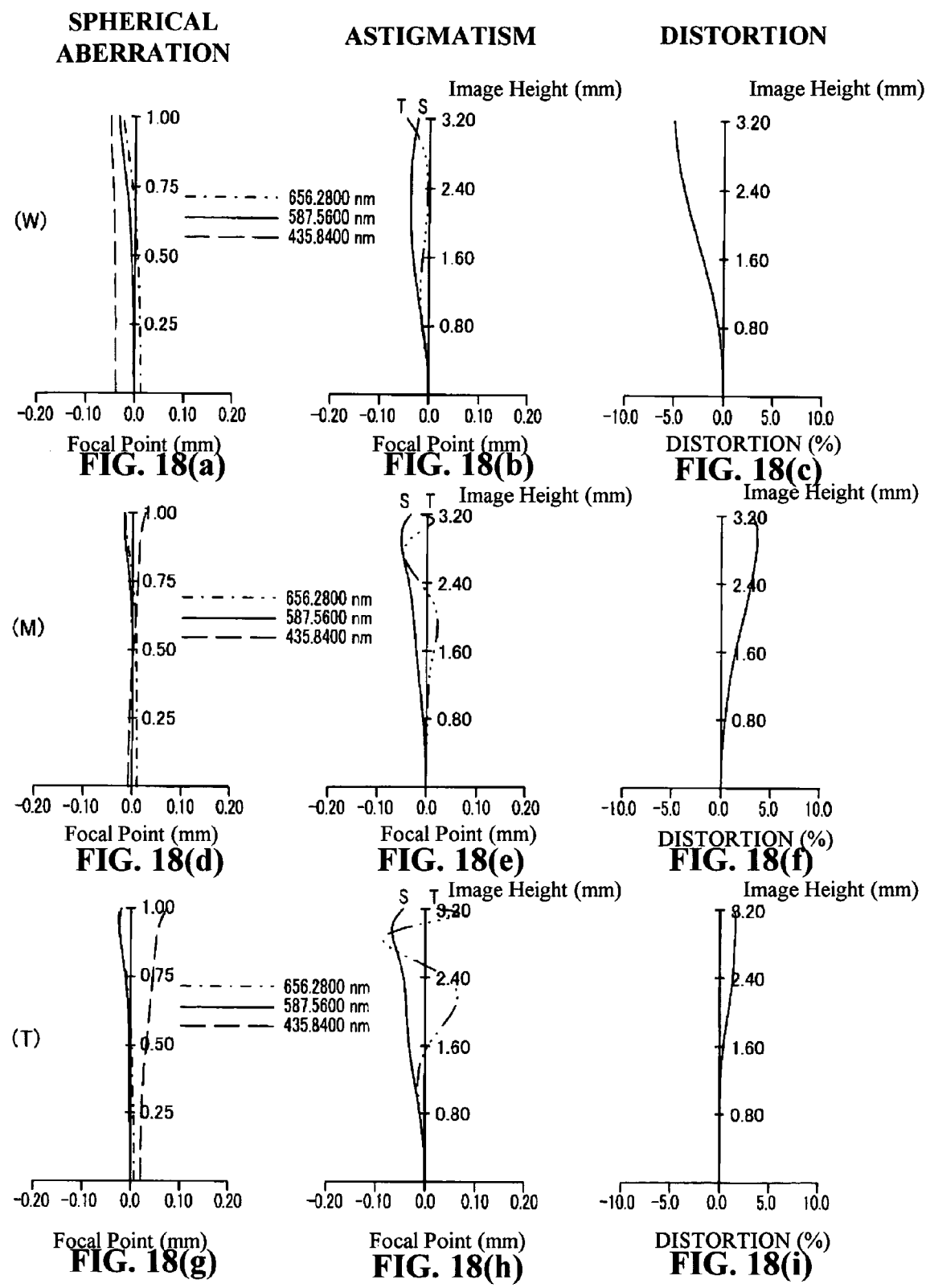

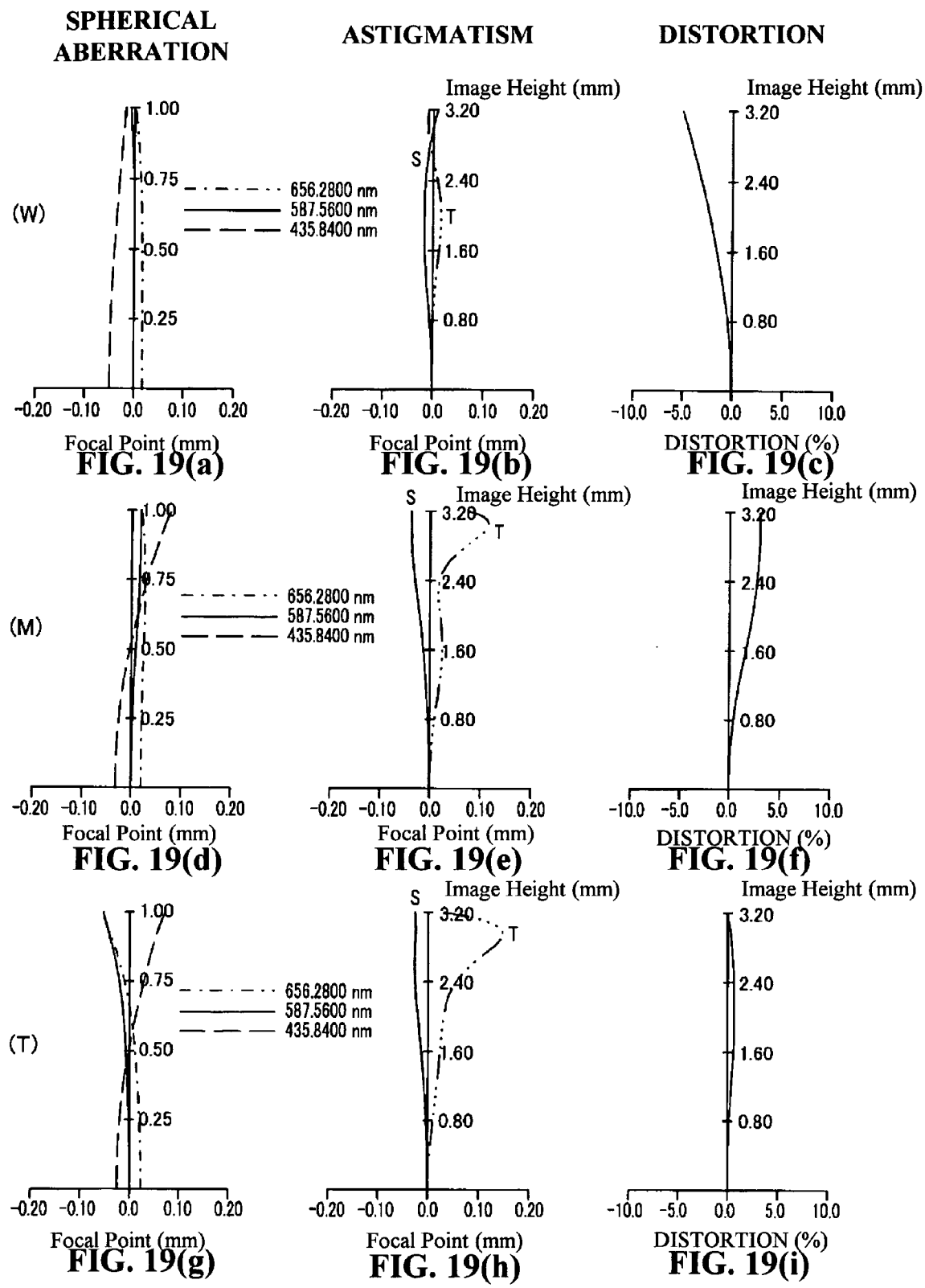

VARIABLE POWER OPTICAL SYSTEM, IMAGE PICKUP LENS DEVICE, AND DIGITAL DEVICE

The present application claims priority to Japanese Patent Application No. 2004-152075 filed on May 21, 2004, the entire content of which is hereby incorporated by reference.

BACKGROUND OF THE INVENTION

1. Field of the Invention

The present invention relates to a variable power optical system that is composed of a plurality of lens groups and changes a gap between the lens groups in an optically axial direction so as to vary power, an image pickup lens device having the variable power optical system, and a digital device with the image pickup lens device.

2. Description of the Related Art

In recent years, cellular phones and personal digital assistants (PDA) noticeably spread, and these devices generally include compact digital still camera units and digital video units. Since sizes and costs of these devices are strictly restrained, small-sized image sensors whose number of pixels is lower than that of independent digital still-image cameras or the like, and image pickup lens devices which include single focus optical systems composed of 1 to 3 plastic lenses are generally used.

Since, however, power of the single focus optical systems is equivalent to that in the case of visual inspection, objects to be photographed are limited to objects near photographers. From this viewpoint, at the present when the pixels and the functions of the image sensors are being heightened abruptly, compact variable power optical systems, which can cope with high-pixel image sensors, can pick up images of objects separated from photographers and can be installed into cellular phones or the like, are required.

As the compact variable power optical systems, for example, U.S. Pat. Nos. 5,009,491 and 6,349,002 propose a so-called three-component (negative, positive and positive) variable power optical system which are composed of a first lens group having negative optical power, a second lens group and a third lens group having positive optical power arranged in this order from an object. Further, Japanese Paten Application Laid-Open No. 7-306362 proposes a five-component variable power optical system that includes four components: negative, positive, positive and negative starting from a first lens group closest to an object in order to realize a high definition optical system. In these three prior arts, the first lens group is composed of a cemented lens, thereby facilitating assembly adjustment. Further, Japanese Patent Application Laid-Open No. 7-306362 discloses a constitution in which optical power of respective lens groups, moving conditions of the lens groups due to power variation, and the like are suitably set so that a total optical length is shortened.

Hereinafter, for example, the cemented lens, whose lenses are made to be integral in a fixed manner and thus which can be regarded as one lens, is called as "lens element". That is to say, a lens system, which is constituted so that a cemented lens composed of two lenses and single lens are arranged in close contact with each other or with a distance and are supported by different members, are composed of two lens elements.

In the variable power optical system in U.S. Pat. No. 5,099,491, the first lens groups is composed of only integrated and demented lens which can be regarded as one lens element, but the second lens group and the third lens group are not integrated with each other and thus composed of a plurality of lens elements. Concretely, the second lens groups is composed of two lens elements including one cemented lens and one single lens, and the third lens group is composed of three to four single lenses, namely, three to four lens elements. As a result, a total number of the lenses in the optical system is 8 to 9, namely, large, and a total optical length is also long. In the variable power optical system in U.S. Pat. No. 6,349,002, the first lens group is composed of only one cemented lens, but the second lens group is composed of three lens elements including one cemented lens and two single lenses, and the third lens group is composed of one single lens, namely, one lens element. Further, since a moving amount of the second lens group is large, a total optical length becomes long, and thus this system is not suitable for more compact structure. An F number of a wide-angle end is about 3.5 to 4, namely, dark, and thus this system is not practical. Further, in the variable power optical system in Japanese Patent Application Laid-Open No. 7-306362, although a first lens group is composed of only cemented lens, namely, has the simple structure, a total number of lenses is 10, namely, large, thereby increasing the cost. In addition, since a number of lens groups to be moved at the time of power variation is five, namely, large, a number of lens elements is very large.

In the variable power optical systems in U.S. Pat. Nos. 5,009,491 and 6,349,002, a number of the lens groups is three, but a number of the lens elements composing the groups is not less than five. A number of the lens elements in these systems is not greatly different from a number in the system in Japanese Patent Application Laid-Open No. 7-306362. For this reason, in all the variable power optical systems according to the prior arts, the supporting members which support the lens elements and mechanisms including a lens driving device become complicated, and this causes an increase in the unit size. As a result, in the conventional variable power optical systems, the compatibility with the high definition image sensors, low cost and a compact size such that it can be housed in the cellular phones and PDAs cannot be simultaneously realized.

SUMMARY OF THE INVENTION

It is a main object of the present invention to provide a variable power optical system in which the mechanism is simplified by reducing a number of lens elements and is made to be compact as an entire lens system.

It is another object of the present invention to provide an inexpensive variable power optical system which does not require so-called electronic zoom for obtaining a zoomed-in image by means of interpolation and can cope with high-pixel image sensor of not less than 2 million pixels.

In order to achieve these objects and another object, from a certain aspect of the present invention, a variable power optical system, that forms an optical image of an object on a light receiving surface of an image sensor for converting an optical image into an electric signal and changing gaps between lens groups in an optically axial direction so as to vary power, includes:

a first lens group having negative optical power;
a second lens group having positive optical power; and
a third lens group, which are arranged in this order from an object side,
wherein
when the power is varied from a wide-angle end to a telephoto end, the gap between the first lens group and the second lens group is narrowed, the first lens group is composed of two or more lenses, at least three lens groups are composed only a single lens or a lens where countered lens surfaces in the lens group are in close contact with each other without providing a gap.

According to this constitution, the first lens group which is the closest to the object has the negative optical power, namely, has a so-called negative lead structure. For this reason, a light beam which enters from the object side at a large angle can be loosened instantaneously by the negative optical power of the first lens group. With the structure of the negative lead, if the size is reduced, rise in error sensitivity can be suppressed.

In general, when the first lens group is composed of one negative lens, in order to suppress occurrence of astigmatism and power chromatic aberration in the first lens group, the optical power of the first lens group cannot be strengthened. As a result, a diameter of a front lens in the first lens group increases. On the other hand, when the first lens group is composed of two or more lenses, the optical power can be strengthened while the aberration is being suppressed, thereby preventing the increase in the diameter of the front lens.

Since at least three lens groups are composed of only a single lens or a lens where countered lens surfaces in the lens group are in close contact with each other without providing a gap, unnecessary inter-surface reflected light can be suppressed.

From another aspect of the present invention, a variable power optical system, that forms an optical image of an object on a light receiving surface of an image sensor for converting an optical image into an electric signal and changes gaps between the lens groups in an optically axial direction so as to vary power, includes:

a first lens group having negative optical power;

a second lens group having positive optical power; and a third lens group, which are arranged in this order from an object side, wherein when the power is varied from a wide-angle end to a telephoto end, the gap between the first lens group and the second lens group is narrowed, the first lens group is composed of two or more lenses, at least three lens groups are composed of a single lens or a lens where adjacent lenses in each lens group are integrated with each other in a fixed manner.

According to this constitution, since at least three lens groups are composed of only a single lens or a lens where adjacent lenses in each lens group are integrated with each other in a fixed manner, it is not necessary to provide a plurality of supporting members for supporting the lenses and lens driving devices to the lens groups. As a result, a mechanical mechanism can be simplified, thereby making an entire image pickup lens device compact. In the case where the lens groups are composed of a plurality of lenses, when the lenses are cemented, the error sensitivity due to eccentricity can be reduced. Further, since the gap is present between the lens surfaces due to the cementing, unnecessary inter-surface reflected light can be suppressed.

The invention itself, together with further objects and attendant advantages, will best be understood by reference to the following detailed description taken in conjunction with the accompanying drawings.

BRIEF DESCRIPTION OF THE DRAWINGS

FIGS. 11(a) to 11(i) are aberration diagrams illustrating spherical aberration, astigmatism and distortion aberration of the lens groups in the variable power optical system in the first embodiment;

FIGS. 13(a) to 13(i) are aberration diagrams illustrating spherical aberration, astigmatism and distortion aberration of the lens groups in the variable power optical system in the third embodiment;

FIGS. 14(a) to 14(i) are aberration diagrams illustrating spherical aberration, astigmatism and distortion aberration of the lens groups in the variable power optical system in the fourth embodiment;

FIGS. 15(a) to 15(i) are aberration diagrams illustrating spherical aberration, astigmatism and distortion aberration of the lens groups in the variable power optical system in the fifth embodiment;

FIGS. 16(a) to 16(i) are aberration diagrams illustrating spherical aberration, astigmatism and distortion aberration of the lens groups in the variable power optical system in the sixth embodiment;

FIGS. 17(a) to 17(i) are aberration diagrams illustrating spherical aberration, astigmatism and distortion aberration of the lens groups in the variable power optical system in the seventh embodiment;

FIGS. 18(a) to 18(i) are aberration diagrams illustrating spherical aberration, astigmatism and distortion aberration of the lens groups in the variable power optical system in the eighth embodiment;

FIGS. 19(a) to 19(i) are aberration diagrams illustrating spherical aberration, astigmatism and distortion aberration of the lens groups in the variable power optical system in the ninth embodiment;

In the following description, like parts are designated by like reference numbers throughout the several drawing.

DETAILED DESCRIPTION OF THE PREFERRED EMBODIMENTS

Figures 20A, 20B:
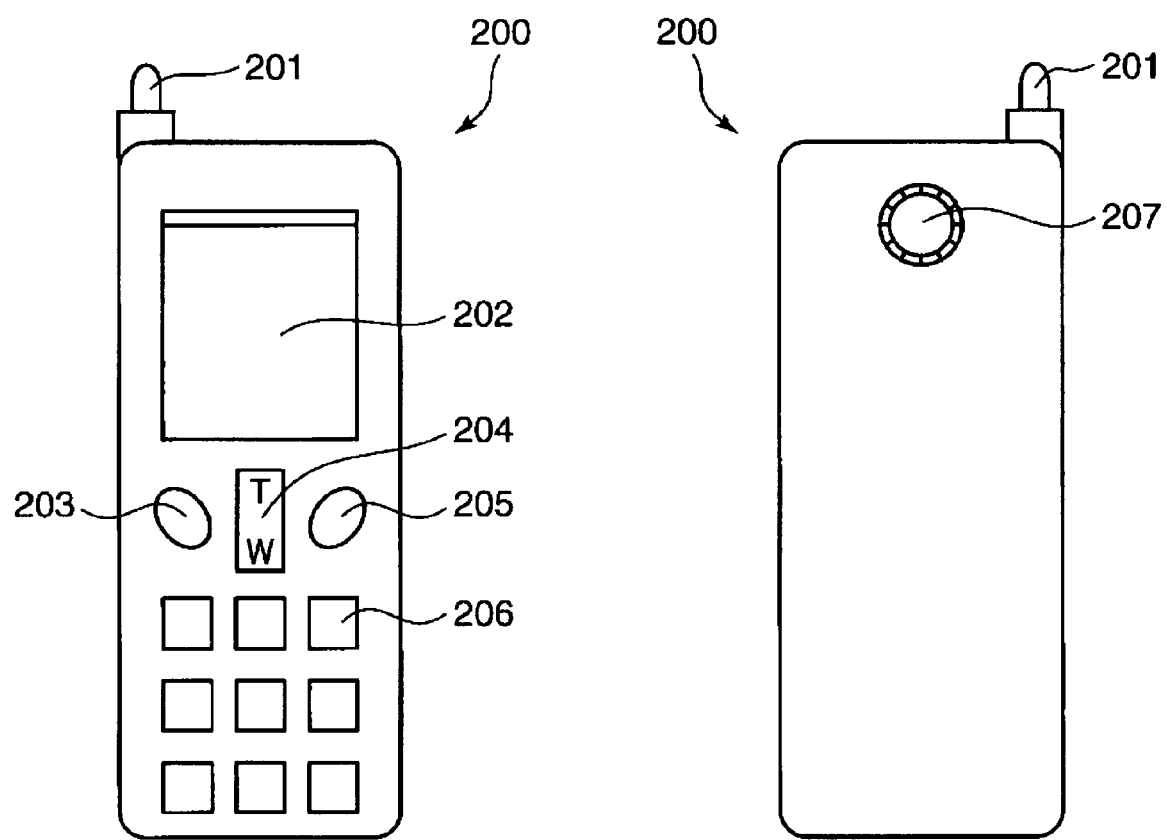
FIG. 20(a) is an outline constitutional drawing illustrating an operation surface of a camera cellular phone with the variable power optical system according to the present invention.
FIG. 20(b) is an outline constitutional drawing illustrating a rear surface of the operation surface of the camera cellular phone with the variable power optical system according to the present invention.

FIGS. 20(a) and 20(b) are outline constitutional diagrams of a camera cellular phone illustrating a digital device according to one embodiment of the present invention. In the present invention, the digital device includes a digital still camera, digital camcorder, a personal digital assistant (PDA), a personal computer and a mobile computer as well as the cellular phone, or their peripheral devices. The digital still camera and the digital camcorder are image pickup lens device that optically captures an image of an object, converts the image into an electric signal using a semiconductor element, and stores the electric signal as digital data in a storage medium such as a flash memory. In the present invention, the digital device further includes a cellular phone, a personal digital assistant, a personal computer, and a mobile computer that have compact image pickup lens device for optically capturing still or moving pictures of an object, or their peripheral devices.

FIG. 20(a) illustrates an operation surface of the cellular phone, and FIG. 20(b) illustrates a rear surface of the operation surface, namely, a back surface. A cellular phone main body 200 has an antenna 201 on its upper portion, a display 202 on the operation surface, an image switching button 203 that actuates an image photographing mode and switches between a still picture and a moving picture, a variable power button 204 that controls variable power (zooming) according to the present invention, a shutter button 205, and dial buttons 206. The variable power button 204 is composed of a two-contact type switch or the like where "T" representing a telephoto end is printed on its upper end portion and "W" representing a wide-angle end is printed on its lower end portion. When the printed position is pressed down, respective variable power operations can be performed. Further, the cellular phone main body 200 contains an image pickup lens device (camera) 207 composed of the variable power optical system of the present invention, and a photographing lens is exposed on the back surface.

When a still image is photographed, the image switching button 203 is pressed down, and the image photographing mode is actuated. When the image switching button 203 is pressed down one time, the still image photographing mode is actuated, and when, in this state, the image switching button 203 is pressed down again, the moving image photographing mode is actuated. When the still image photographing mode is actuated, an image of an object is picked up periodically and repeatedly by the image sensor such as CCD via the image pickup lens device 207, and the images are transmitted to a display memory to be led to the display 202. When a photographer watches the display 202, the main object can be adjusted so as to be within a desired position on a screen. When, in this state, the shutter button 205 is pressed down, the still image can be obtained, namely, image data are stored in a still image memory.

At this time, in the case where the object is separated from a photographer or zoom photographing is carrying out in order to zoom in an object near the photographer, when the "T" printed portion on the upper end of the variable power button 204 is pressed down, this state is detected, and a lens is driven for power variation according to pressing-down time, so that zooming is carried out sequentially. In the case where the zooming-in power is reduced like when, for example, excessive zooming is carried out, when the "W" printed portion on the lower end of the variable power button 204 is pressed down, this state is detected so that the power is sequentially varied according to pressing-down time. In such a manner, as to even the object separated from the photographer, its zooming-in power can be adjusted by using the variable power button 204.

Similarly to normal photographing with same power, a main object is adjusted so as to be within a desired position on the screen, and the shutter button 205 is pressed down, so that a zoomed-in still image can be obtained.

In the case where a moving image is photographed, after the still image photographing mode is actuated by pressing down the image switching button 203 one time, the image switching button 203 is pressed down again so that the mode is switched into the moving image photographing mode. Similarly to the photographing of still image, hereinafter, the photographer watches the display 202 and adjusts the image of the object obtained via the image pickup lens device 207 is within a desired position of the screen. At this time, the zoom-in power of the object image can be adjusted by the variable power button 204. When, in this state, the shutter button 205 is pressed down, the moving image is started to be photographed. During the photographing, the zoom-in power of the object can be changed by the variable power button 204 as needed. When the shutter button 205 is pressed down once more, the photographing of the moving image is ended. The moving image is led to the display memory for the display 202 and is led to a moving image memory to be stored.

The variable power button 204 according to the present invention is not limited to this embodiment, and the provided dial buttons 206 may be used, or a function which can vary the power to two ways: zooming-in and zooming-out such as a rotary-type dial having a rotary axis on a dial button provision surface may be provided.

The present invention is not limited to the cellular phone and can be applied to another digital devices such as a digital still camera, a digital camcorder, a personal digital assistant, a personal computer and a mobile computer, or their peripheral devices.

The image pickup lens device 207 according to the present invention shown in FIG. 20(b) is composed of, from the rear surface, namely, from the object side, a lens system that forms an optical image of an object, a plane parallel plate corresponding to an optical low-pass filter or the like, and an image sensor that converts the optical image formed by the lens system into an electric signal. As the lens system, a high-performance and compact variable power optical system which enables zooming is strongly demanded in order to enable also the photographing of an object separated from a photographer. In the variable power optical system, a plurality of lens groups compose the lens system, and gaps between the lens groups are changed in an optically axial direction, so that power is varied and focusing is carried out. The present invention relates to the variable power optical system, the image pickup lens device that forms an optical image of an object on a light receiving surface of the image sensor for converting the optical image into an electric signal using the variable power optical system, and a digital device that includes the image pickup lens device and the image sensor, and has a function for photographing a still image or a moving image.

The variable power optical system composing the image pickup lens device 207 of the camera cellular phone shown in FIG. 20(*b*) according to the present invention is explained below with reference to the drawings.

An optical power of respective single lenses composing the cemented lens indicates a power when both sides of the lens surfaces of the single lenses have an interface with air, namely, the single lenses are singularly present in this specification.

(First Embodiment)

Figure 1:
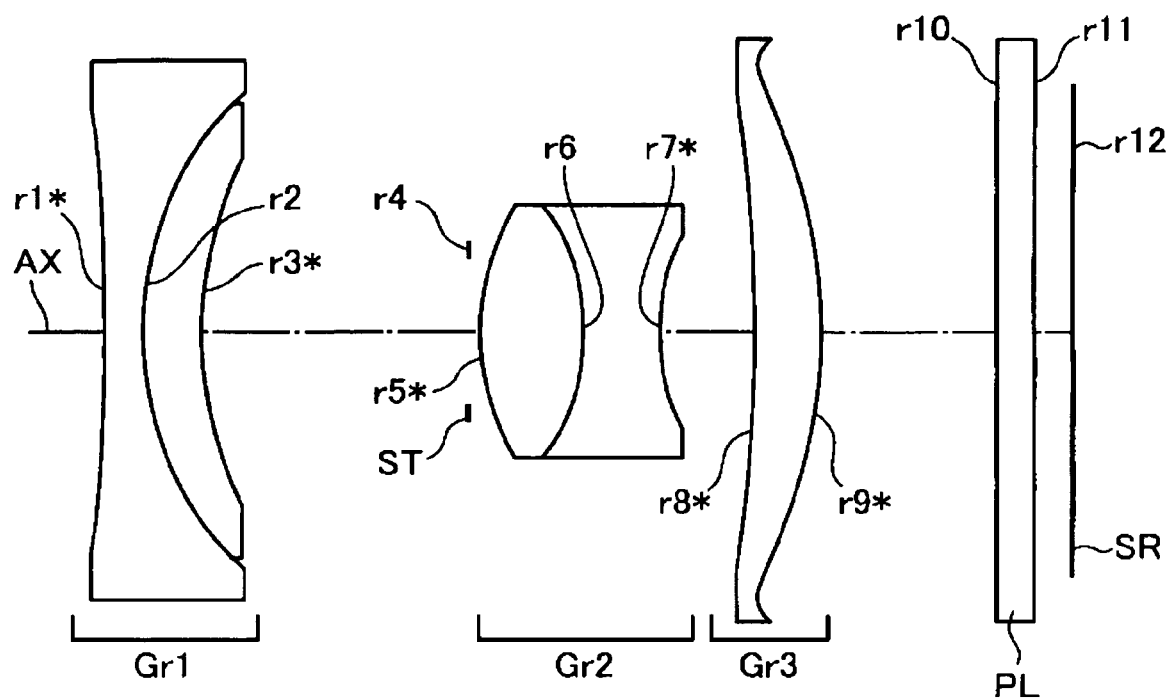
FIG. 1 is a sectional view in which an optical axis of a variable power optical system in a first embodiment is cut longitudinally.

FIG. 1 is a sectional view illustrating an arrangement of the lens groups in the variable power optical system in a first embodiment in which an optical axis (AX) is cut longitudinally. FIGS. 1 to 9, the lens arrangement at a wide-angle end (W) is shown. In the first embodiment, the lens groups are composed of, from an object side (a left side in FIG. 1), a first lens group (Gr1) entirely having a negative optical power, a second lens group (Gr2) having a positive optical power, and a third lens group (Gr3) having a positive optical power. In each embodiment, the second lens group (Gr2) on the first lens group (Gr1) side has an optical stop (ST) that adjusts a light amount. Further, the plane parallel plate (PL) and the image sensor (SR) are arranged on an opposite side of the second lens group (Gr2) which is adjacent to the third lens group (Gr3) (in a fourth and an eighth embodiments, an opposite side of the third lens group (Gr3) which is adjacent to the fourth lens group (Gr4)).

In this specification, terms "concave", "convex" and "meniscus" relating to the lens are used, but they represent the shapes of the lens near the optical axis (center portion of the lens) and do not represent shapes of the entire lens or near the end of the lens. This does not become a problem in a spherical lens, but it is generally necessary to pay an attention to an aspherical lens because the center portion and the end portion of the lens have different shapes. The variable power optical system in the first embodiment shown in FIG. 1 is composed of the following lens groups arranged from the object side. The first lens group (Gr1) entirely having the negative optical power is a cemented lens composed of a negative lens with both concave surfaces (lens having the negative optical power) and a convex positive meniscus lens (lens having positive optical power) on the object side. The second lens group (Gr2) entirely having the positive optical power is a cemented lens composed of a positive lens with both convex surfaces and a negative lens with both concave surfaces. The third lens group (Gr3) entirely having the positive optical power is one positive meniscus lens on an image side. Numbers ri (i=1, 2, 3, . . . ) shown in FIG. 1 is an i-numbered lens surface when a number of the lens surfaces is counted from the object side (however, the cemented surfaces of the lens are counted as one surface), and the surface where * is added to ri is an aspherical surface.

A number of the lenses in the cemented lens does not represent a number of the cemented lens, but represents a number of the single lenses composing the cemented lens. For example, a number of the lenses in the cemented lens composed of three single lenses is not one but three.

In such a constitution, a light beam which enters from the object side in the drawing passes through the first, the second and the third lens groups (Gr1, Gr2 and Gr3) successively, and an optical image of an object is formed there. The optical image formed by the lens groups passes through the plane parallel plate (PL) arranged to be adjacent to the third lens group (Gr3). At this time, the optical image is corrected so that a so-called loopback noise, which is generated when the optical image is converted into an electric signal by the image sensor (SR), is minimized. The plane parallel plate (PL) corresponds to an optical low-pass filter, an infrared cut filter, a cover glass for the image sensor or the like. Finally, the image sensor (SR) converts the optical image corrected by the plane parallel plate (PL) into an electric signal. The electric signal is subject to a digital image process, an image compressing process or the like as the need arises, and it is recorded as a digital video signal in a memory of a cellular phone, a personal digital assistant or the like, or is transmitted to another digital device via a wire or a radio.

FIGS. 10(*a*) to 10(*e*) are pattern diagrams showing a moving method for the lens groups at the time of the power variation, and simultaneously show moving methods for the lens groups in the second and after embodiments, mentioned later. In FIGS. 10(*a*) to 10(*e*), similarly to the conventional manner, the left side is the object side, and the first lens group (Gr1), the second lens group (Gr2) and the third lens group (Gr3) (in the fourth and eighth embodiments, a fourth lens group (Gr4) is provided) are arranged in this order from the object side. In these drawings, a reference character "W" represents a wide-angle end where a focal length is the shortest, namely, a field angle is the largest, and a reference character "T" represents a telephoto end where the focal length is the longest, namely, the field angle is the smallest. Further, a reference character "M" represents that the focal length is in a middle portion (hereinafter, a midpoint) between the wide-angle end (W) and the telephoto end (T). The lens groups are actually moved on a straight line along the optical axis, but in these drawings, the lens groups at the wide-angle end (W), the midpoint (M) and the telephoto end (T) are arranged in this order from up-to-down directions.

In the variable power optical system in which the optical power is composed of three components including negative, positive, and positive components, the second lens group (Gr2) mostly takes on the variable power operations. For this reason, the second lens group (Gr2) mainly has the optical power. In the compact variable power optical system according to the present invention, however, it is difficult to secure a variable power ratio of about two to three only by the movement of the second lens group (Gr2). For this reason, the lens groups other than the second lens group (Gr2) handle the power varying operations. In the lens structure of the first embodiment shown in FIG. 1, the position of the first lens group (Gr1) is fixed at the time when the power is varied from the wide-angle end (W) to the telephoto end (T). The second lens group (Gr2) is moved to a direction where it reaches the object, and on the contrary, the third lens group (Gr3) is moved linearly to a direction where it is separated from the object. The second lens group (Gr2) and the third lens group (Gr3) mainly takes on the power varying operations.

Similarly to the first embodiment, the lens constitutions in second to ninth embodiments are sequentially explained below with reference to the drawings. At this time, reference numerals in FIGS. 2 to 9 are similar to those in FIG. 1.

(Second Embodiment)

Figure 2:
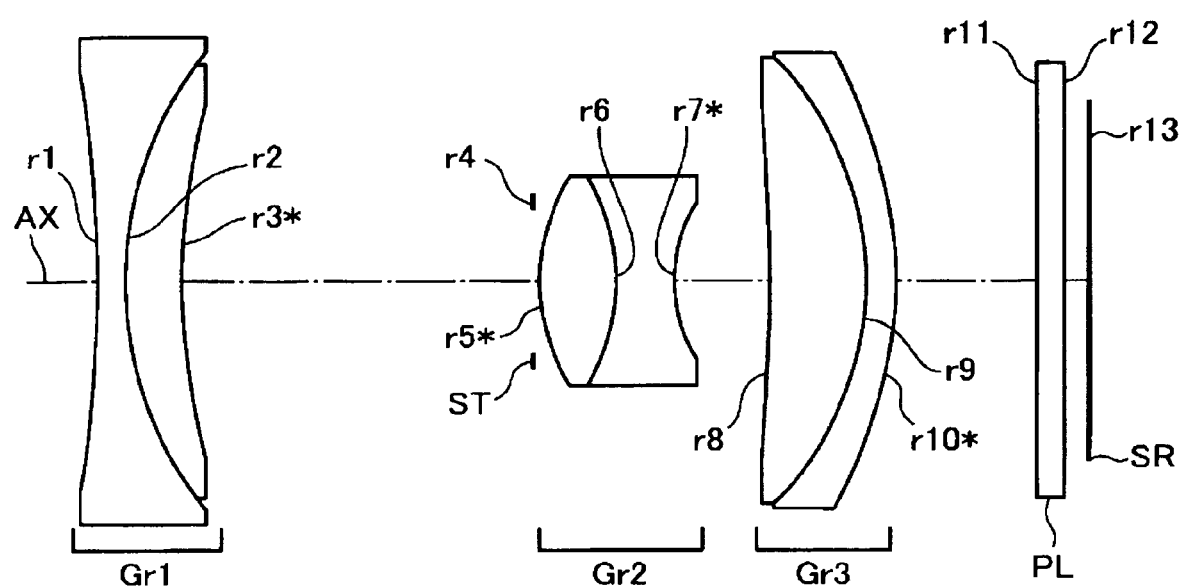
FIG. 2 is a sectional view in which the optical axis of the variable power optical system in a second embodiment is cut longitudinally.

FIG. 2 is a sectional view illustrating an arrangement of the lens groups in the variable power optical system in the second embodiment in which the optical axis (AX) is cut longitudinally. In the variable power optical system in the second embodiment, the lens groups are constituted to be arranged from the object side in the following manner. The first lens group (Gr1) entirely having negative optical power is a cemented lens composed of a negative lens with both concave surfaces and a positive meniscus lens with convex surface on the object side. The second lens group (Gr2) entirely having positive optical power is a cemented lens composed of a positive lens with both convex surfaces and a negative lens with both concave surfaces. The third lens group (Gr3) entirely having positive optical power is composed of a positive lens on both convex surfaces and a negative meniscus lens with convex surface on an image side.

In such a lens constitution of the second embodiment, when the power is varied from the wide-angle end (W) to the telephoto end (T), as shown in FIGS. 10(a) to 10(e), the first lens group (Gr1) is moved so as to draw a trajectory of convex shape on the image side. That is to say, the first lens group (Gr1) is made to be close to the image side once in the middle of the wide-angle end (W) and a midpoint (M), and then is moved to the object side. The second lens group (Gr2) is moved linearly to a direction where it reaches the object, and on the contrary, the third lens group (Gr3) is moved linearly to a direction where it is separated from the object. That is to say, differently from the first embodiment, since all the three lens groups are moved, these three lens groups take on the power variation and the aberration correction collectively.

(Third Embodiment)

Figure 3:
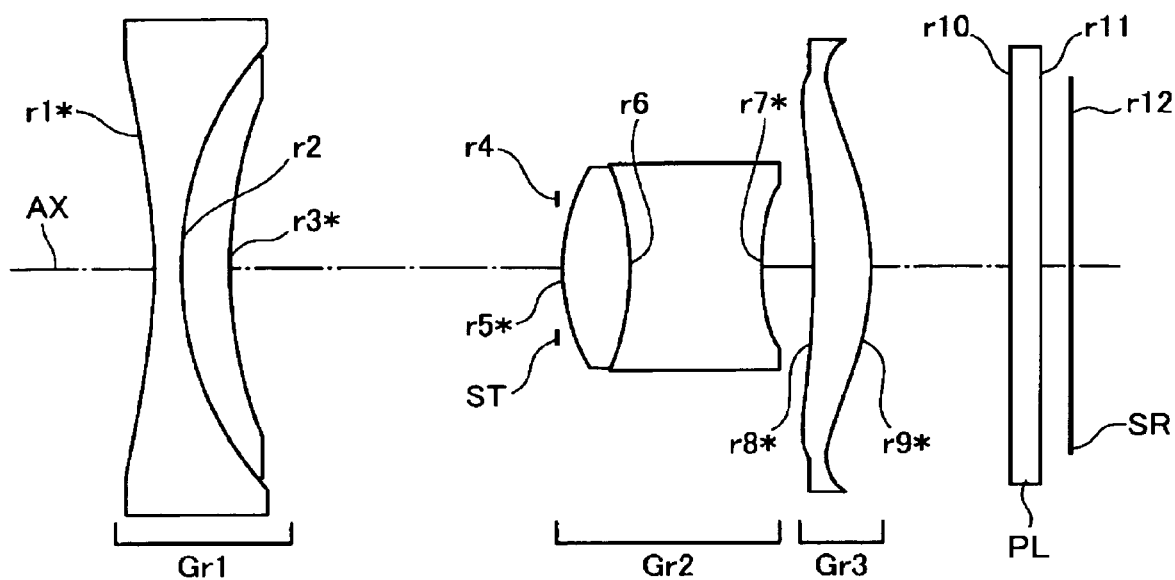
FIG. 3 is a sectional view in which the optical axis of the variable power optical system in a third embodiment is cut longitudinally.

FIG. 3 is a sectional view illustrating an arrangement of the lens groups in the variable power optical system in a third embodiment in which the optical axis (AX) is cut longitudinally. In the variable power optical system in the third embodiment shown in FIG. 3, the lens groups are constituted to be arranged from the object side in the following manner. The first lens group (Gr1) entirely having negative optical power is a cemented lens composed of a negative lens with both concave surfaces and a positive meniscus lens with convex surface on the object side. The second lens group (Gr2) entirely having positive optical power is a cemented lens composed of a positive lens with both convex surfaces and a negative lens with both concave surfaces. The third lens group (Gr3) entirely having positive optical power is one positive meniscus lens with convex surface on the image side.

In such a lens constitution in the third embodiment, as shown in FIGS. 10(a) to 10(e), when the power is varied from the wide-angle end (W) to the telephoto end (T), the first lens group (Gr1) is moved so as to draw a trajectory of the convex shape on the image side. That is to say, the first lens group (Gr1) is made to be the closest to the image side near the midpoint (M), and thereafter it is moved to the object side. At this time, the positions of the first lens group (Gr1) at the wide-angle end (W) and the telephoto end (T) are approximately equal with each other. The second lens group (Gr2) is moved linearly to the direction where it reaches the object, and on the contrary, the third lens group (Gr3) is linearly moved to the direction where it is separated from the object. That is to say, the three lens groups take on the power variation and the aberration correction collectively.

(Fourth Embodiment)

Figure 4:
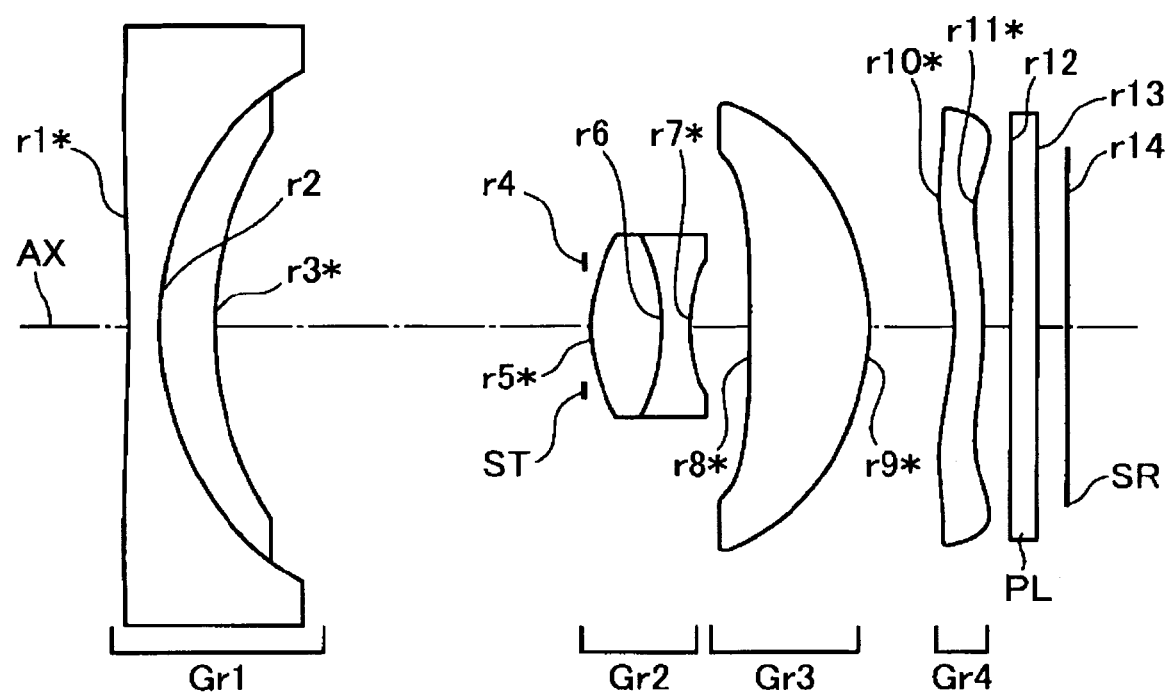
FIG. 4 is a sectional view in which the optical axis of the variable power optical system in a fourth embodiment is cut longitudinally.

FIG. 4 is a sectional view illustrating an arrangement of the lens groups in the variable power optical system in a fourth embodiment in which the optical axis (AX) is cut longitudinally. In the fourth embodiment shown in FIG. 4, differently from the other embodiments, a fourth lens group (Gr4) having negative optical power is further provided. In the variable power optical system in the fourth embodiment, the lens groups are constituted to be arranged from the object side in the following manner. The first lens group (Gr1) entirely having negative optical power is a cemented lens composed of a negative lens with both concave surfaces and a positive meniscus lens with convex surface on the object side. The second lens group (Gr2) entirely having positive optical power is a cemented lens composed of a positive lens with both convex surfaces and a negative lens with both concave surfaces. The third lens group (Gr3) entirely having positive optical power is one positive meniscus lens with convex surface on the image side. The fourth lens group (Gr4) entirely having negative optical power is one negative meniscus lens with convex surface on the image side.

In such a lens constitution in the fourth embodiment, when the power is varied from the wide-angle end (W) to the telephoto end (T), as shown in FIGS. 10(a) to 10(e), the first lens group (Gr1), the second lens group (Gr2) and the third lens group (Gr3) are moved so as to draw the trajectory similar to that in the third embodiment. The position of the fourth lens group (Gr4) is fixed. At this time, since the fourth lens group (Gr4) is provided in the fourth embodiment, a moving amount of the third lens group (Gr3) is suppressed to be smaller than that in the first to the third embodiments. Further, in the fourth embodiment, the first lens group (Gr1), the second lens group (Gr2) and the third lens group (Gr3) take on the power variation and the aberration correction collectively.

(Fifth Embodiment)

Figure 5:
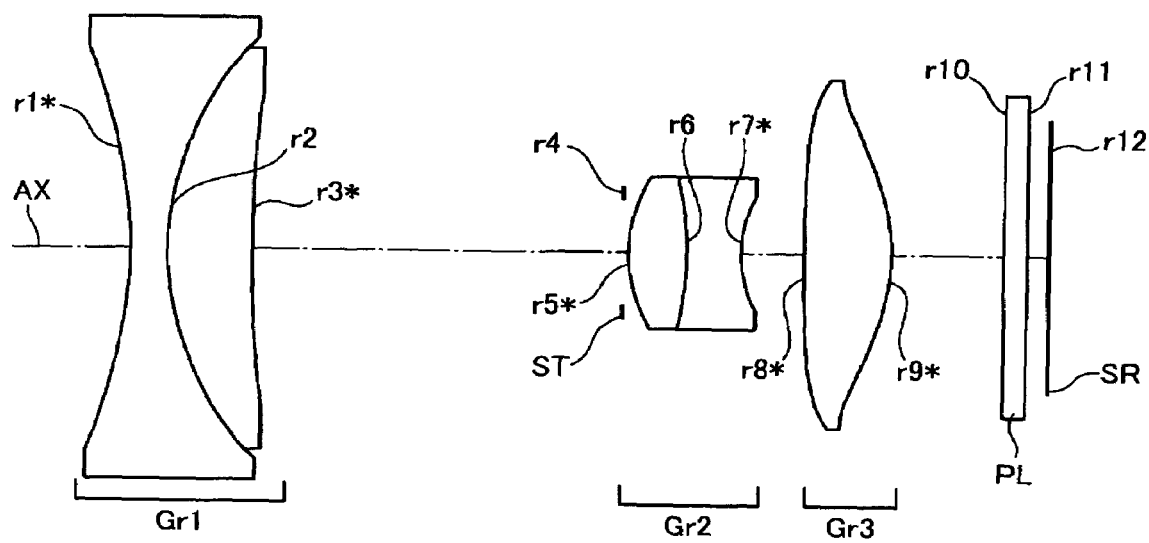
FIG. 5 is a sectional view in which the optical axis of the variable power optical system in a fifth embodiment is cut longitudinally.

FIG. 5 is a sectional view illustrating an arrangement of the lens groups in the variable power optical system in a fifth embodiment in which the optical axis (AX) is cut longitudinally. In the variable power optical system in the fifth embodiment, the lens groups are constituted to be arranged from the object side in the following manner. The first lens group (Gr1) entirely having negative optical power is a cemented lens composed of a negative lens with both concave surfaces and a positive meniscus lens with convex surface on the object side. The second lens group (Gr2) entirely having positive optical power is a cemented lens composed of a positive lens on both convex surfaces and a negative lens with both concave surfaces. Further, the third lens group (Gr3) entirely having positive optical power is one positive lens with both convex surfaces.

In such a lens constitution in the fifth embodiment, as shown in FIGS. 10(a) to 10(e), when the power is varied from the wide-angle end (W) to the telephoto end (T), the first lens group (Gr1), the second lens group (Gr2) and the third lens group (Gr3) are moved so as to draw the same trajectory as that in the third embodiment. That is to say, the three lens groups take on the power variation and the aberration correction collectively.

(Sixth Embodiment)

Figure 6:
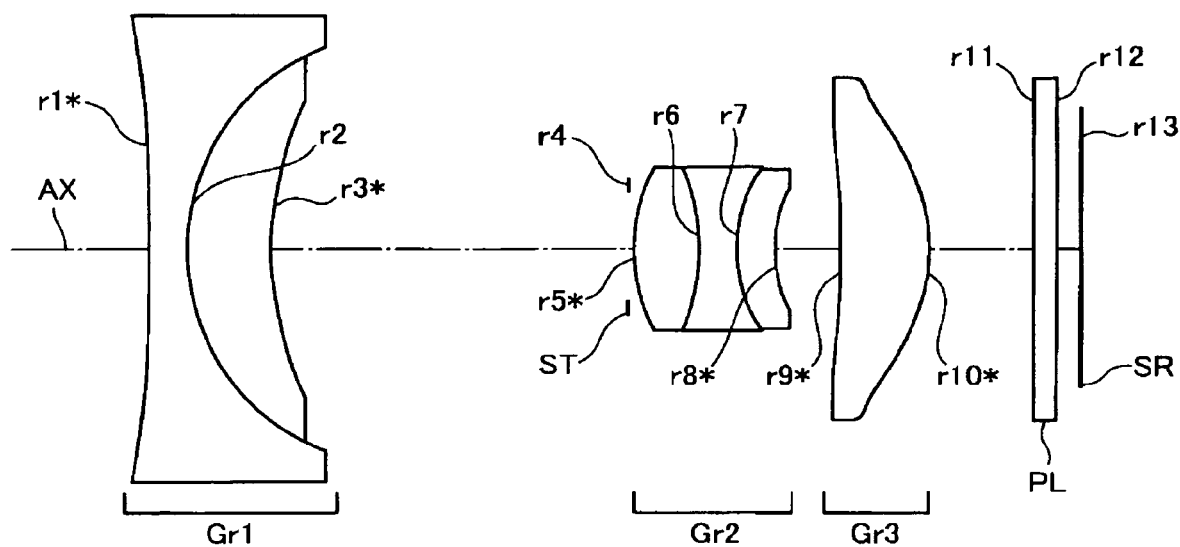
FIG. 6 is a sectional view in which the optical axis of the variable power optical system in a sixth embodiment is cut longitudinally.

FIG. 6 is a sectional view illustrating an arrangement of the lens groups in the variable power optical system in a sixth embodiment in which the optical axis (AX) is cut longitudinally. In the variable power optical system in the sixth embodiment, the lens groups are constituted to be arranged from the object side in the following manner. The first lens group (Gr1) entirely having negative optical power is a cemented lens composed of a negative meniscus lens with convex surface on the object side and a positive meniscus lens with convex surface on the object side. The second lens group (Gr2) entirely having positive optical power is composed of a positive lens with both convex surfaces, a negative lens with both concave surfaces and a positive meniscus lens with convex surface on the object side. Further, the third lens group (Gr3) entirely having positive optical power is one meniscus lens with convex surface on the image side.

In such a lens constitution in the sixth embodiment, when the power is varied from the wide-angle end (W) to the telephoto end (T), as shown in FIGS. 10(*a*) to 10(*e*), the first lens group (Gr1), the second lens group (Gr2) and the third lens group (Gr3) are moved so as to draw the same trajectory as that in the third and the fifth embodiments. That is to say, the three lens groups take on the power variation and the aberration correction collectively.

(Seventh Embodiment)

Figure 7:
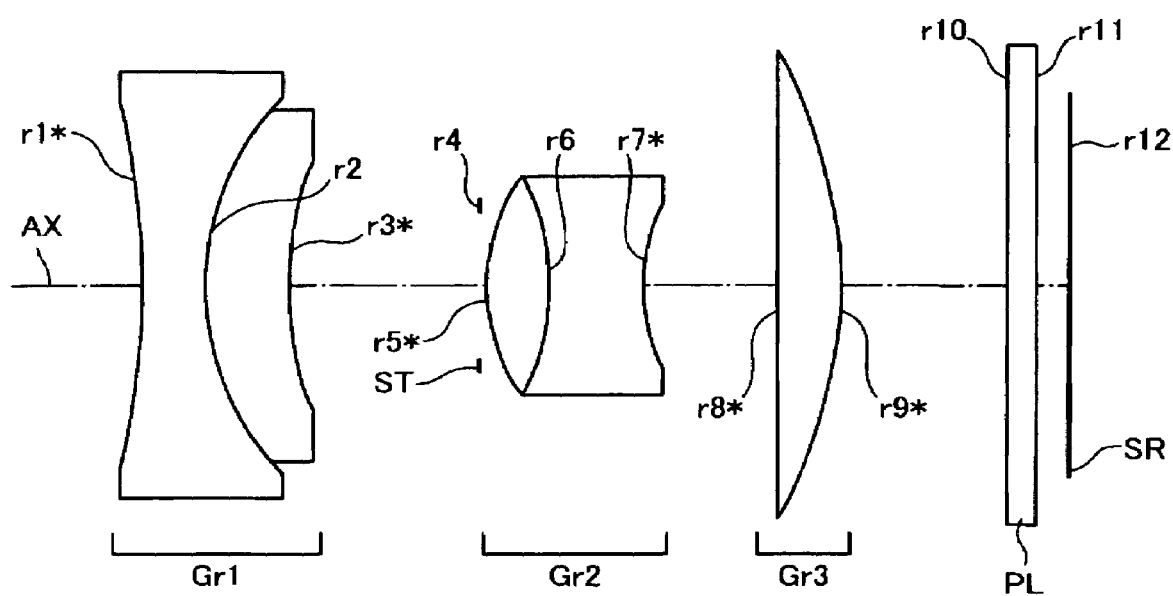
FIG. 7 is a sectional view in which the optical axis of the variable power optical system in a seventh embodiment is cut longitudinally.

FIG. 7 is a sectional view illustrating an arrangement of the lens groups in the variable power optical system in a seventh embodiment in which the optical axis (AX) is cut longitudinally. In the variable power optical system in the seventh embodiment, the lens groups are arranged to be arranged from the object side and are constituted in the following manner. The first lens group (Gr1) entirely having negative optical power is a cemented lens composed of a negative lens with both concave surfaces and a positive meniscus lens with convex surface on the object side. The second lens group (Gr2) entirely having positive optical power is a cemented lens composed of a positive lens with both convex surfaces and a negative lens with both concave surfaces. Further, the third lens group (Gr3) entirely having positive optical power is one positive meniscus lens with convex surface on the image side.

In such a lens constitution in the seventh embodiment, when the power is varied from the wide-angle end (W) to the telephoto end (T), the first lens group (Gr1) and the second lens group (Gr2) are linearly moved to the direction where they reach the object, and on the contrary, the third lens group (Gr3) is linearly moved to the direction where it is separated from the object. That is to say, the three lens groups take on the power variation and the aberration correction collectively.

(Eighth Embodiment)

Figure 8:
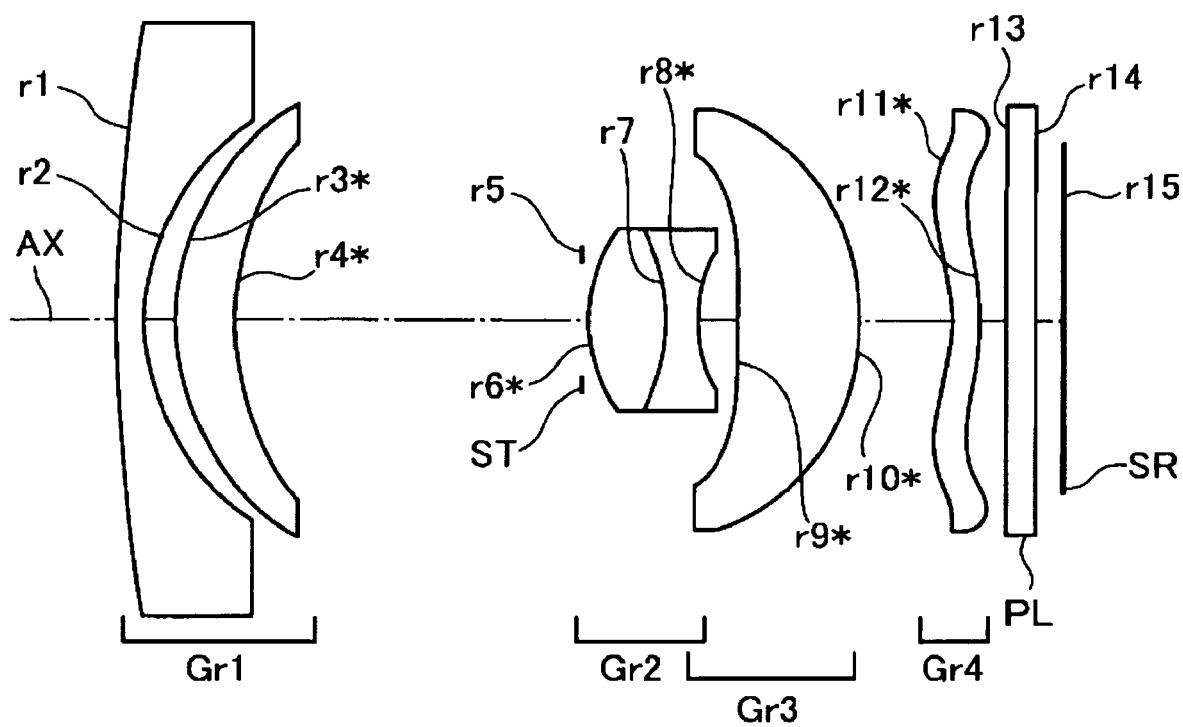
FIG. 8 is a sectional view in which the optical axis of the variable power optical system in an eighth embodiment is cut longitudinally.

FIG. 8 is a sectional view illustrating an arrangement of the lens groups in the variable power optical system in an eighth embodiment in which the optical axis (AX) is cut longitudinally. In the variable power optical system in the eighth embodiment, the lens groups are arranged sequentially from the object side and are constituted in the following manner. The first lens group (Gr1) entirely having negative optical power is composed of a negative meniscus lens with convex surface on the object side and a positive meniscus lens with convex surface on the object side. The second lens group (Gr2) entirely having positive optical power is a cemented lens composed of a positive lens with both convex surfaces and a negative lens with both concave surfaces. The third lens group (Gr3) entirely having positive optical power is one positive meniscus lens with convex surface on the image side. Further, the fourth lens group (Gr4) entirely having negative optical power is one negative meniscus lens with convex surface on the image side.

In such a lens constitution in the eighth embodiment, when the power is varied from the wide-angle end (W) to the telephoto end (T), as shown in FIGS. 10(*a*) to 10(*e*), the first lens group (Gr1), the second lens group (Gr2) and the third lens group (Gr3) are moved so as to draw the same trajectory to that in the fourth embodiment. That is to say, the first lens group (Gr1), the second lens group (Gr2) and the third lens group (Gr3) take on the power variation and the aberration correction collectively.

[Ninth Embodiment]

Figure 9:
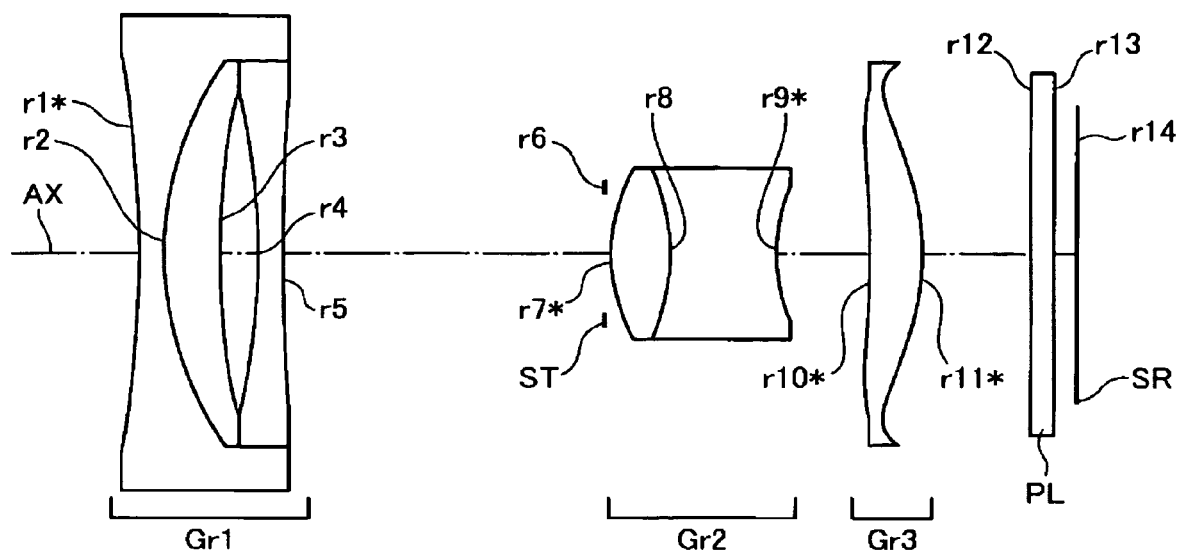
FIG. 9 is a sectional view in which the optical axis of the variable power optical system in a ninth embodiment is cut longitudinally.
Figure 10A:
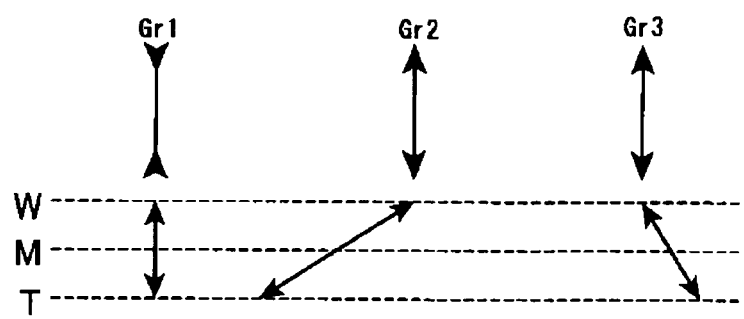
FIGS. 10(a) to 10(e) are pattern diagrams illustrating movement of lens groups in the variable power optical systems in the first to the ninth embodiments.
Figure 10B:
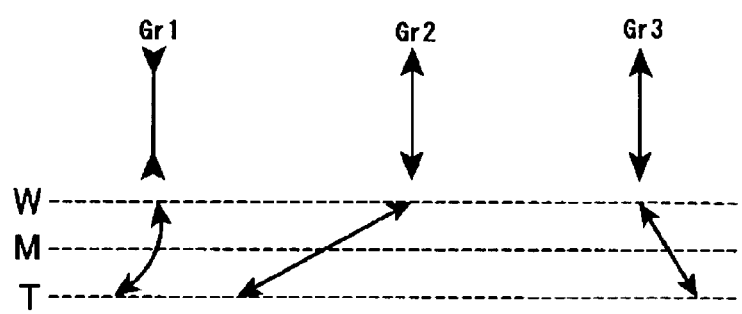
Figure 10C:
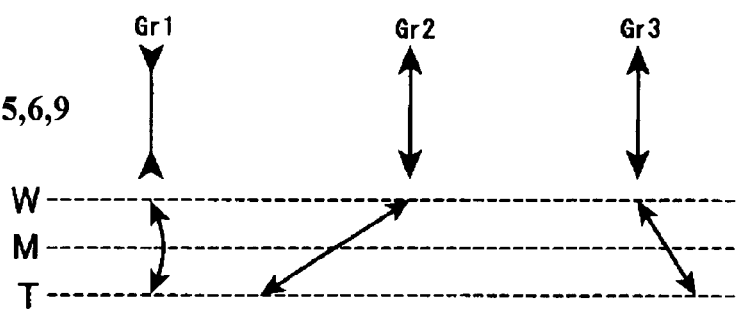
Figure 10D:
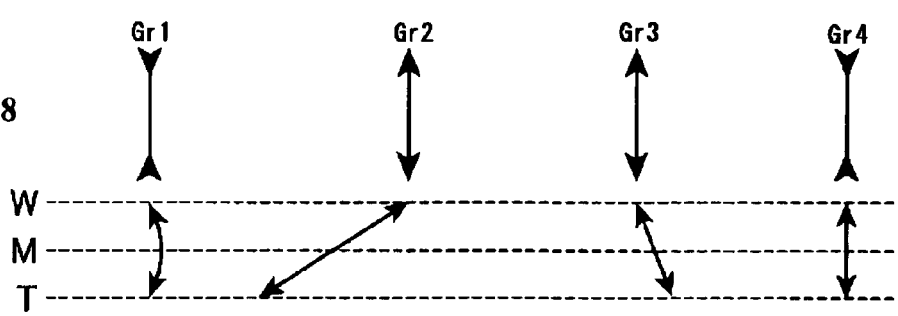
Figure 10E:
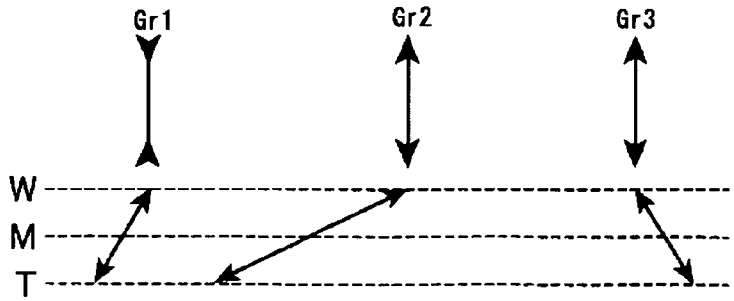
Figure 12A:
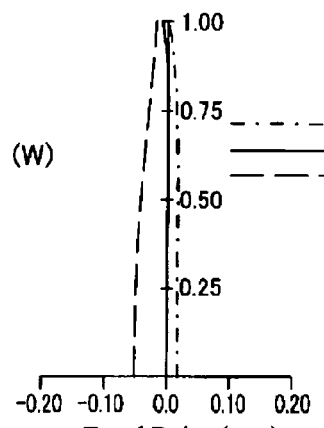
FIGS. 12(a) to 12(i) are aberration diagrams illustrating spherical aberration, astigmatism and distortion aberration of the lens groups in the variable power optical system in the second embodiment.
Figure 12B:
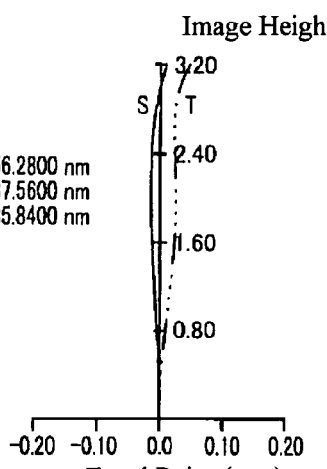
Figure 12C:
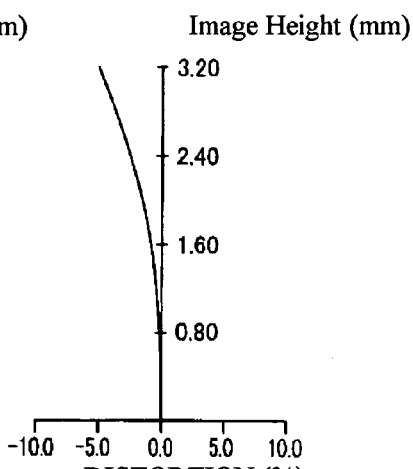
Figure 12D:
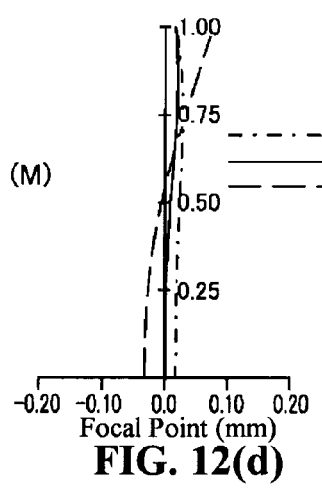
Figure 12E:
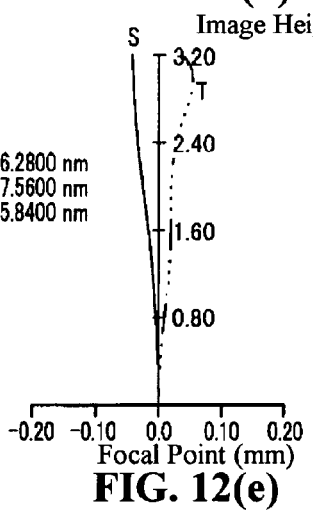
Figure 12F:
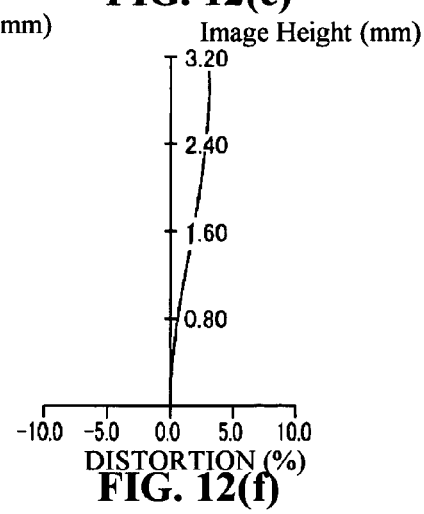
Figure 12G:
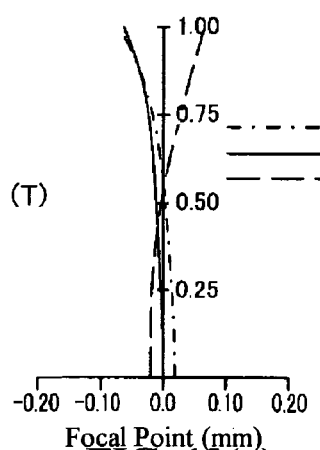
Figure 12H:
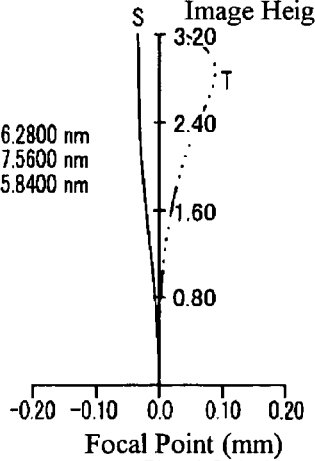
Figure 12I:
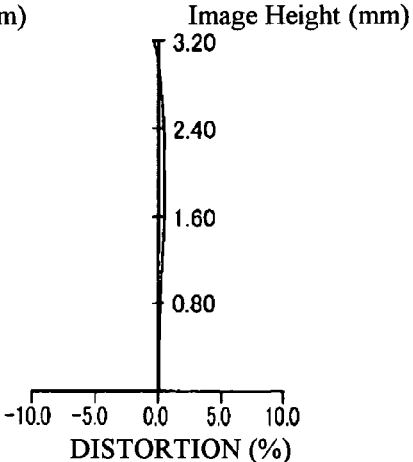

FIG. 9 is a sectional view illustrating an arrangement of the lens groups in the variable power optical system in a ninth embodiment in which the optical axis (AX) is cut longitudinally. In the variable power optical system in the ninth embodiment, the lens groups are arranged sequentially from the object side and are constituted in the following manner. The first lens group (Gr1) entirely having negative optical power is composed of a cemented lens including a negative lens with both concave surfaces and a positive meniscus lens with convex surface on the object side, and a negative lens with both concave surfaces. The second lens group (Gr2) entirely having positive optical power is a cemented lens composed of a positive lens with both convex surfaces and a negative lens with both concave surfaces. Further, the third lens group (Gr3) entirely having positive optical power is one positive meniscus lens with convex surface on the image side.

In the ninth embodiment, a fitting type lens is used as the first lens group (Gr1). That is to say, in the lens which is the closest to the object, a portion with a predetermined thickness is extended in a center direction of the lens from the outermost periphery to the image side, and the second and the third lenses from the object side in the first lens group (Gr1) are fitted into the extended portion so as to be fixed integrally. At this time, the surfaces of the first and the second lenses from the object side are cemented, but a surface gap between the second and the third lenses from the object side has an air gap. The first lens group (Gr1) has one lens element, and thus a number of the members for supporting the lenses can be reduced to the minimum number.

In such a lens constitution in the ninth embodiment, when the power is varied from the wide-angle end (W) to the telephoto end (T), as shown in FIGS. 10(*a*) to 10(*e*), the first lens group (Gr1), the second lens group (Gr2) and the third lens group (Gr3) are moved so as to draw the similar trajectory to that in the third, fifth and sixth embodiments. That is to say, the three lens groups take on the power variation and the aberration correction collectively.

In the first to the ninth embodiments, the optical stop (ST) is moved together with the second lens group (Gr2) whose moving amount is the largest. For this reason, an increase in an effective lens outer diameter of the second lens group (Gr2) can be suppressed. Further, according to this constitution, since it is not necessary to provide a driving device for exclusive use of the optical stop, the constitution of the lens driving device is facilitated, and the entire image pickup lens device can be compact.

The present invention, however, is not limited to this, and the optical stop (ST) may be moved independently from the lens groups. According to this constitution, when the power is varied from the wide-angle end to the telephoto end, an off-axial light beam incident angle with respect to the image sensor can be suitably controlled by the optical stop (ST).

Conditions of the optical properties required by the variable power optical system in the embodiments or conditional expressions are described below, and the basis of the conditions (or the basis of numerical value range) is explained.

Like the embodiments, in the variable power optical system which includes the first lens group (Gr1) having negative optical power and the second lens group (Gr2) having positive optical power which are arranged in this order from the object side, wherein when the power is varied from the wide-angle end to the telephoto end, an interval between the first lens group (Gr1) and the second lens group (Gr2) is narrowed, and the first lens group (Gr1) is composed of two or more lenses, the following conditional expression is desirably satisfied:

$$0.5 < f_2/f_3 < 2 \qquad (1)$$

where,
$f_2$: total focal length of the second lens group (Gr2), and
$f3$: total focal length of the third lens group (Gr3)

When the value exceeds the upper limit in the expression (1), the optical power of the second lens group (Gr2) is weak, and thus a moving amount of the second lens group (Gr2) increases. Further, when the value is less than the lower limit in the expression (1), the optical power of the third lens group (Gr3) is weak, and thus a moving amount of the third lens group (Gr3) increases, thereby increasing the entire optical length in both the cases.

In the above variable power optical system, it is desirable that the total focal length of the second lens group (Gr2) and the entire optical system satisfies the following conditional expression.

$$0.7 < f_2/f_w < 2 \qquad (2)$$

where,
$f_w$: total focal length of the entire optical system at the wide-angle end (W).

When the value exceeds the upper limit in the expression (2), the optical power of the second lens group (Gr2) becomes too weak, and thus it is difficult to obtain variable power ratio of about two to three. Further, when the value is less than the lower limit in the expression (2), eccentricity error sensitivity of the second lens group (Gr2) becomes high, and thus the manufacturing becomes difficult.

It is more desirable that the total focal length of the second lens group (Gr2) and the entire system satisfies the following conditional expression:

$$1 < f_2/f_w < 1.8 \qquad (2)'$$

When the value exceeds the upper limit in the expression (2)', the optical power of the second lens group (Gr2) is weak, and thus a moving amount of the second lens group (Gr2) increases at the time of power variation, thereby lengthening the entire optical length. Further, when the value is less than the lower limit in the expression (2)', eccentricity error sensitivity of the second lens group (Gr2) becomes high, and the gap between the lenses in the second lens group (Gr2) and the gap between the second lens group (Gr2) and another lens group should be adjusted, thereby increasing the cost.

In the above variable power optical system, when the cemented lens of the first lens group (Gr1) is composed of two lenses: a negative lens and a positive lens in this order from the object side, it is desirable that an Abbe number of the first lens group (Gr1) satisfies the following conditional expression:

$$|v_{1n} - v_{1p}| > 15 \qquad (3)$$

where,
$v_{1n}$: Abbe number of the negative lens in the first lens group (Gr1), and
$v_{1p}$: Abbe number of the positive lens in the first lens group (Gr1).

When the value is less than the lower limit in the expression (3), power chromatic aberration correction in the first lens group (Gr1) becomes insufficient, and thus contrast is deteriorated.

In the variable power optical system, it is desirable that the total focal length of the first lens group (Gr1) and the entire optical system satisfies the following conditional expression:

$$1 < |f_1/f_w| < 4 \qquad (4)$$

where,
$f_1$: total focal length of the first lens groups (Gr1), and
$f_w$: total focal length of the entire optical system at the wide-angle end (W).

When the value exceeds the upper limit in the expression (4), correction of astigmatism and distortion aberration particularly at the wide-angle end is insufficient. On the contrary, when the value is less than the lower limit in the expression (4), the optical power of the lenses composing the first lens group (Gr1) becomes strong, and thus the manufacturing becomes difficult. Further, an influence of the power chromatic aberration becomes strong, and thus its correction becomes difficult.

It is desirable that the total focal length of the first lens group (Gr1) and the entire optical system satisfies the following conditional expression:

$$1.5 < |f_1/f_w| < 3.5 \qquad (4)'$$

When the value exceeds the upper limit in the expression (4)', the negative optical power of the first lens group (Gr1) is weakened, and thus a diameter of the front lens increases. On the other hand, when the value is less than the lower limit in the expression (4)', the optical power of the first lens group (Gr1) becomes strong, and the error sensitivity of the first lens group (Gr1) particularly at the telephoto end (T) rises, thereby requiring adjustment of the gap between the lenses.

In the variable power optical system, it is desirable that the focal length in the first lens group (Gr1) satisfies the following conditional expression:

$$0.3 < |f_{1n}/f_{1p}| < 0.8 \qquad (5)$$

where,
$f_{1p}$: total focal length of the positive lens in the cemented lens of the first lens group (Gr1), and
$f_{1n}$: total focal length of the negative lens in the cemented lens of the first lens group (Gr1).

When a ratio of the focal length exceeds the upper limit in the expression (5), the correction of astigmatism and distortion aberration particularly at the wide-angle end (W) is insufficient. On the contrary, when the ratio is less than the lower limit in the expression (5), the optical power of the lenses composing the first lens group (Gr1) becomes high, and thus the manufacturing becomes difficult. Further, an influence of the power chromatic aberration becomes great, and thus its correction also becomes difficult.

In the variable power optical system, it is desirable that the total focal length of the second lens group (Gr2) and the entire optical system satisfies the following conditional expression:

$$0.1 < f_2/f_T < 0.9 \qquad (6)$$

where,
$f_T$: total focal length of the entire optical system at the telephoto end (T)

When the value exceeds the upper limit in the expression (6), the optical power of the second lens group (Gr2) becomes too weak, and thus it is difficult to obtain the power ratio of about two to three. Further, when the value is less than the lower limit in the expression (6), the error sensitivity of the second lens group (Gr2) becomes high, and thus the manufacturing becomes difficult.

It is more desirable that the total focal length of the second lens group (Gr2) and the entire optical system satisfies the following conditional expression:

$$0.3 < f_2/f_T < 0.7 \tag{6}'$$

When the value exceeds the upper limit in the expression (6)', the optical power of the second lens group (Gr2) is weak, and thus a moving amount of the second lens group (Gr2) at the time of power variation increases, thereby lengthening the entire optical length. When the value is less than the lower limit in the expression (6)', the eccentricity error sensitivity of the second lens group (Gr2) is heightened, and thus it is necessary to adjust the gap between the lenses in the second lens group (Gr2) and gaps between the second lens group (G2) and the other lens groups, thereby increasing the cost.

It is desirable that the variable power optical system satisfies the following conditional expression:

$$0.1 < Y'/TL < 0.5 \tag{7}$$

where,

Y': effective image circle diameter, and

TL: the maximum value on the optical axis from a face vertex of the lens surface closest to the object side to the image surface in the entire variable power area.

When the value exceeds the upper limit in the expression (7), a moving amount of the second lens group (Gr2) which takes on the power variation becomes small, and thus optical power required by the second lens group (Gr2) becomes strong. As a result, it is difficult to satisfy manufacturing requirements such as radius of curvature in the lenses of the second lens group (Gr2). When the value is less than the lower limit in the expression (7), the entire optical length becomes long, and thus it is difficult to install the variable power optical system into the digital devices such as cellular phones due to its size.

It is more desirable that the variable power optical system satisfies the following conditional expression:

$$0.13 < Y'/TL < 0.3 \tag{7}'$$

When the value exceeds the upper limit in the equation (7)', the optical power of the second lens group (Gr2) becomes strong, thereby heightening the error sensitivity in the second lens group (Gr2). When the value is less than the lower limit in the expression (7)', not only the increase in the size of the optical system but also an increase in a load on the lens driving system due to the increase in the moving amount at the time of the power variation are caused. As a result, the lens driving device is enlarged.

It is desirable that the variable power optical system satisfies the following conditional expression:

$$0.2 < f_W/T_W < 0.5 \tag{8}$$

where, $T_W$: length on the optical axis from the surface vertex of the lens surface closest to the object to the image surface at the wide-angle end (W).

When the value exceeds the upper limit in the expression (8), the astigmatism is deteriorated, and when the value is less than the lower limit in the expression (8), the entire optical length becomes long. As a result, it is difficult to install the variable power optical system into the digital devices such as cellular phones due to its size.

It is desirable that the variable power optical system satisfies the conditional expression:

$$0.5 < f_T/T_T < 1 \tag{9}$$

where, $T_T$: length on the optical axis from the surface vertex of the lens surface closest to the object side to the image surface at the telephoto end (T).

When the value exceeds the upper limit in the expression (9), a moving amount of the second lens group (Gr2) is limited, and thus it is difficult to obtain the power ratio of about two to three. When the value is less than the lower limit in the expression (9), the entire optical length becomes long, and thus it is difficult to install the variable power optical system into the digital devices such as cellular phones due to its size.

In the variable power optical system, it is desirable that the second lens group (Gr2) is composed of a positive lens and a negative lens arranged in this order from the object side and satisfies and the following conditional expression:

$$|\nu_{2n} - \nu_{2p}| > 10 \tag{10}$$

where, $\nu_{2n}$: Abbe number of the negative lens in the second lens group (Gr2), and $\nu_{2p}$: Abbe number of the positive lens in the second lens group (Gr2).

When the value is less than the lower limit in the expression (10), on-axial chromatic aberration correction in the second lens group (Gr2) becomes insufficient, and thus the on-axial contrast is deteriorated.

In the variable power optical system, it is desirable that the focal length in the second lens group (Gr2) satisfies the following expression:

$$0.9 < |f_{2n}/f_{2p}| < 1.5 \tag{11}$$

where, $f_{2p}$: focal length of the positive lens in the second lens group (Gr2), and $f_{2n}$: focal length of the negative lens in the second lens group (Gr2)

When the value exceeds the upper limit in the expression (11), the correction of the spherical aberration is insufficient. When the value is less than the lower limit in the expression (11), the optical power of the lenses in the second lens group (Gr2) becomes strong, thereby heightening the error sensitivity and deteriorating productivity.

In the variable power optical system, it is desirable that the total focal length of the first lens group (Gr1) and the entire optical system satisfies the following conditional expression:

$$0.5 < |f_1/f_T| < 1.3 \tag{12}$$

When the ratio of the focal length exceeds the upper limit in the expression (12), the correction of the astigmatism and the distortion aberration particularly at the wide-angle end (W) is insufficient. On the contrary, when the value is less than the lower limit in the expression (12), the optical power of the lenses composing the first lens group (Gr1) becomes strong, and thus the manufacturing becomes difficult. Further, the influence of the power chromatic aberration becomes great, and thus its correction is also difficult.

Figure 21:
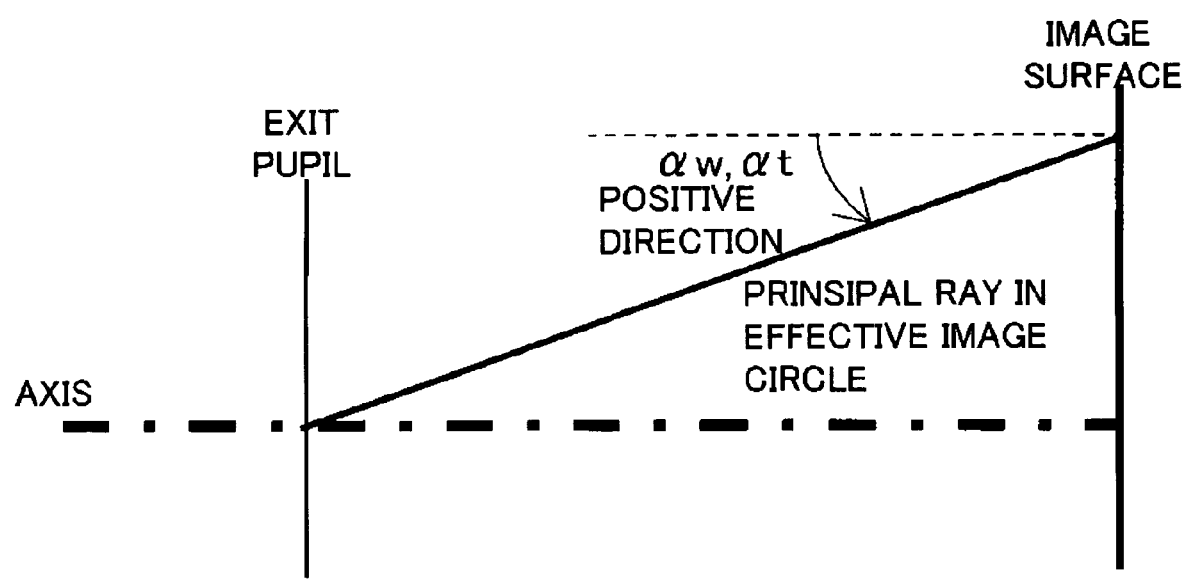
FIG. 21 is a pattern diagram illustrating definition of an image surface incident angle of a principal ray.

In the variable power optical system, it is desirable that an incident angle of a principal ray on an effective image circle diameter in incident ray to the image-pickup surface satisfies the following conditional expression:

$$\alpha_W > 0 \qquad (13)$$

where, $\alpha_W$: angle (° (deg)) formed by the principal ray and a perpendicular on the image surface. As to the image surface incident angle, a direction shown in FIG. 21 is defined as a positive direction. That is to say, αw is an angle, which is formed by the principal beam in the effective image circle diameter widened from an exit pupil position and the perpendicular on the image surface, and is measured in a counterclockwise manner from the perpendicular, when the left side in FIG. 21 is the object side and the right side is the image side. When the incident angle satisfies the expression (13), the wide field angle is maintained and simultaneously compactification can be achieved.

In the variable power optical system, it is desirable that the incident angle of the principal ray on the effective image circle diameter in the incident ray to the image pickup surface satisfies the following conditional expression:

$$|\alpha_W - \alpha_T| < 30 \qquad (14)$$

where, $\alpha T$: degree (° (deg)) formed by the principal ray and the perpendicular on the image surface at the telephoto end. As shown in FIG. 21, as to $\alpha_T$, the counterclockwise direction is defined as the positive direction based on the perpendicular on the image surface similarly to $\alpha_W$. When the incident angle satisfies the expression (14), even if the lens array is arranged on the front side of the image pickup surface, lowering of peripheral illumination can be suppressed.

In the variable power optical system, it is desirable that the refractive index of the lenses as the components satisfies the following expression:

$$\Delta N_{max} > 0.3 \qquad (15)$$

where, $\Delta N_{max}$: the maximum value of a difference in the refractive index of the composing lenses When the refractive index satisfies the expression (15), the Petzval sum can be small, thereby correcting the astigmatism satisfactorily.

In the variable power optical system, it is desirable that the refractive index of the composing lenses satisfies the following expression:

$$N > 1.8 \qquad (16)$$

where,

N: the refractive index of the lens with the largest refractive index in the composing lenses.

When the refractive index satisfies the expression (16), the curvature radius of the lenses for obtaining the equal optical power can be small. As a result, work is facilitated, and the occurrence of aberration can be suppressed. When the lenses have the equal curvature radius, the optical power is strong, thereby making the entire optical system compact.

In the variable power optical system, it is desirable that the second lens group (Gr2) or the lens group closer to the image side than the second lens group is moved singularly or together with the other lens groups to carry out focusing. Since the variable power optical system according to the present invention has such a compact size that it can be installed into the cellular phones or the like, it is disadvantageous from the viewpoint of the entire optical length to move the first lens group (Gr1) to carry out focusing. Further, when the focusing is carried out by the first lens group (Gr1), the diameter of the front lens increases in order to secure the peripheral light amount, and thus this case is not desirable.

In the embodiments, the variable power optical system has a constitution including three components: negative, positive and positive components in this order from the object side. For this reason, in comparison with the two-component (positive and negative) optical system, a moving amount of the second lens group at the time of the power variation is small, the off-axial ray incident angle with respect to a light receiving surface of the image sensor can be controlled by the third lens group.

In the case where the variable power optical system has the three components: negative, positive and positive components in this order from the object side, the optical power of the third lens group is weaker than that of the other lens groups, an effect on the aberration correction is not great. For this reason, it is desirable that the third lens group is composed of one or two lenses. When the third lens group is composed of two lenses, the lenses may be arranged so that an air gap is provided between the lens surfaces or the lens surfaces are in close contact with each other. Further, the lenses are integrated with each other in a fixed manner so as to form the cemented lens.

In any lens groups, in the case where the lens surfaces are made to be in close contact with each other, air or liquid such as matching oil may intervene between the lens surfaces.

In the embodiments, all the lens groups have the aspherical surface, but the invention is not limited to this, and at least one aspherical surface may be provided. In the case where the optical power of the lens group has a constitution including the negative and positive components in this order from the object side, the first lens group mainly relates to the off-axial aberration, and the second lens group mainly relates to the on-axial aberration. When, therefore, the first lens group, the second lens group or another lens group has the aspherical surface, various aberration can be corrected satisfactorily. Further, the optical system can be simultaneously compact. For example, when the aspherical surface is provided to the first lens group (Gr1), the off-axial aberration, particularly the astigmatism and the distortion aberration can be corrected effectively. For example, when the aspherical surface is provided to the second lens group (Gr2), the on-axial aberration, particularly the spherical aberration can be corrected effectively.

When all the lens surfaces having an interface with air are aspherical surfaces, the effect of the aspherical surface can be produced effectively, and thus this case is more desirable. The optical performance of the lens groups generally depends on a difference in the refractive index between the lens group and an adjacent object. According to this constitution, therefore, the effect of the aspherical surface is produced effectively, so that the compactification of the optical system can be balanced with the obtaining of a high-quality image where the aberration is corrected. At this time, the liquid composition is not taken into consideration and further it is not taken into consideration whether the pressure of the liquid is high.

Further, it is desirable that the exit pupil position at the wide-angle end (W) is arranged on a position closer to the object side than the surface of the image sensor. As a result, the wide field angle is secured and simultaneously the optical system can be compact.

The embodiments explain the continuous variable power optical system, but the invention is not limited to this, and a bifocal switching type optical system having the above same optical constitution may be used in order to obtain a more compact structure.

In the embodiments, a mechanical shutter having a function for shielding light with respect to the image sensor (SR) may be arranged as the optical stop (ST). The mechanical shutter is effective for protecting smear in the case where the CCD system is used as the image sensor, for example.

In the ninth embodiment, as the first lens groups (Gr1), a fitting type lens, which is composed of three lenses, and has the air gap between the surfaces of the second and the third lenses from the object side, is used. The present invention, however, is not limited to this embodiment, and at least one lens group is composed of two or more lenses, a portion with a predetermined thickness is extended from the outermost periphery of one lens to the center direction of the lens directing to the image side, and the other lenses are fitted thereinto so as to be constituted integrally in a fixed manner. At this time, the lens surfaces may be in close contact with each other or a gap may be provided therebetween. Further, the lens surfaces may be cemented.

The variable power optical system in the embodiments uses a refractor which deflects an incident light beam due to its refracting function (namely, a lens which deflects a light beam on an interface between media having different refractive indexes), but the usable lens is not limited to this. For example, a diffraction type lens which deflects an incident light beam due to its diffraction function, a refraction/diffraction hybrid type lens which deflects an incident light beam according to a combination of its diffraction function and its refraction function, a refractive index distribution type lens which deflects an incident light beam due to its refractive index distribution in a medium, or the like may be used. Further, besides the optical stop (ST), a flux regulation plate or the like may be arranged as the need arises.

The explained embodiments explain the ultracompact, low-price and high-definition variable power optical system. The entire optical system is composed of three or more lens groups, and when the gaps between the lens groups are changed to the optically axial direction, the power is varied.

At this time, as explained in the embodiments, it is desirable that the first lens group (Gr1) which is the closest to the object side is composed of two or more lenses. When a number of the lenses is smaller than two, it is difficult to correct the astigmatism, the distortion aberration and the power chromatic aberration, thereby heightening the error sensitivity of the lenses. In order to improve this situation, the optical power of the first lens group (Gr1) should be weakened, but in this case, the diameter of the front lens increases, and thus the entire optical system cannot be compact.

Further, it is desirable that at least three lens groups are composed of a single lens, a cemented lens or only a lens where adjacent lenses in the lens group are brought into close contact with each other in a fixed manner, namely, only one lens element. According to this constitution, it is not necessary to provide a plurality of supporting members for supporting the lenses and the lens driving devices into the lens groups. As a result, the mechanical mechanism can be simplified, and the entire image pickup lens device can be more compact.

When the first lens group (Gr1) is a cemented lens, it is desirable that it is composed of at least one negative lens and at least one positive lens arranged in this order from the object side. This is for adopting so-called retrofocus, facilitating the securement of back focus at the wide-angle end (W), and effectively correcting the off-axial aberration of the light beam at the wide field angle. Further, it is more desirable that the object side of the above positive lens has a convex surface. This is for satisfactorily correcting the astigmatism and effectively improving the image surface property.

It is desirable that the second lens group (Gr2) is composed of at least one positive lens and at least one negative lens arranged in this order from the object side. This is for bringing a main point position of the second lens group (Gr2) into close contact with the first lens group (Gr1), reducing the substantial optical power of the second lens group (Gr2) while the power variation function is being maintained, and reducing the error sensitivity. It is more desirable that the positive lens has both convex surfaces. This is for strengthening the optical power of the second lens group (Gr2), and reducing a moving amount of the second lens group (Gr2) at the time of power variation.

It is desirable that the third lens group (Gr3) having the positive optical power is provided to the image surface side of the second lens group (Gr2). This is for making the off-axial ray incident angle with respect to the light receiving surface of the image sensor (SR) close to telecentric.

The image pickup lens device into which the variable power optical system of the present invention is installed according to the present invention is explained below as one example of the concrete embodiment with reference to the drawings.

Figure 22:
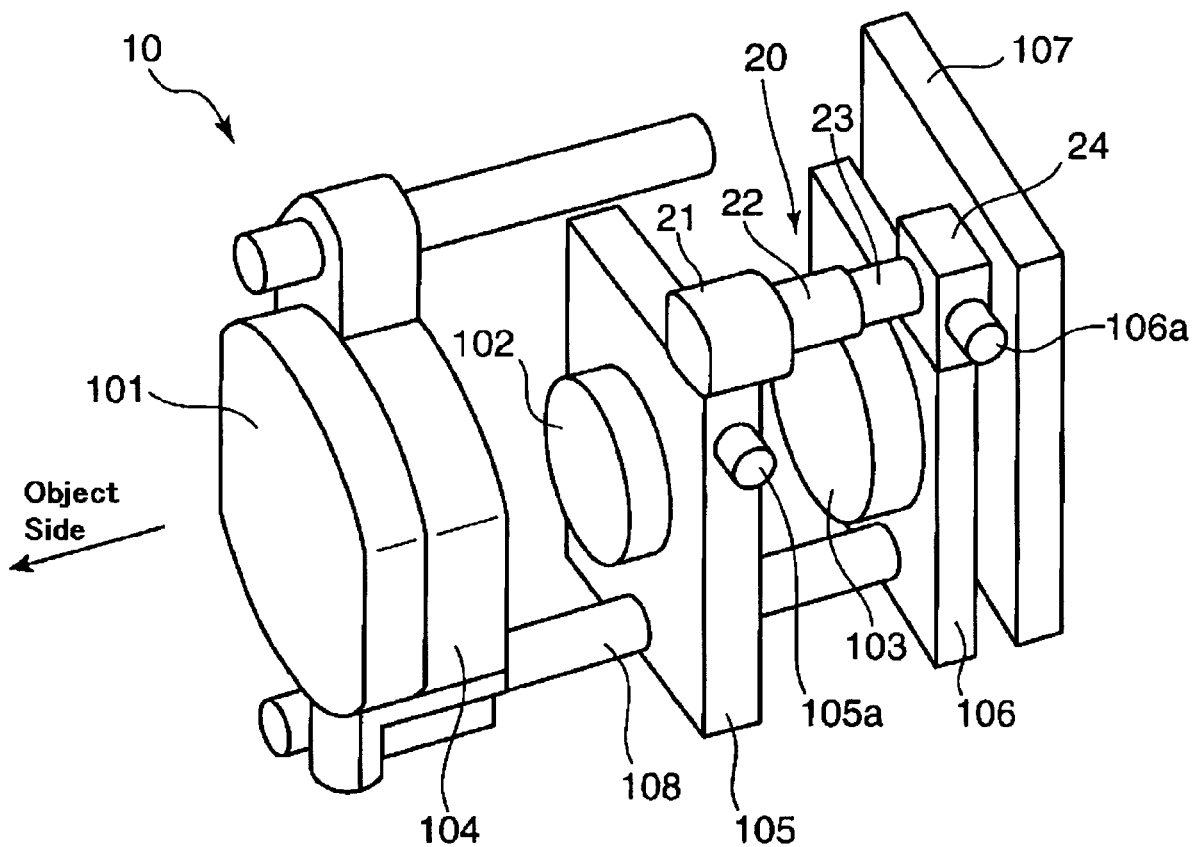
FIG. 22 is a perspective view illustrating one example of an internal constitution in an image pickup lens device having the variable power optical system and the image sensor according to the present invention.

FIG. 22 is a perspective view illustrating one example of an internal constitution of the image pickup lens device 10. This drawing shows the image pickup device having the lens groups composing the variable power optical system, the driving device for the lens groups and the like which includes the image sensor, not shown. In this example, the variable power optical system is composed of the three lens groups. It is assumed that at the time of the power variation, the second lens group 102 and the third lens group 103 are moved so that the power variation and focusing are carried out, and the position of the first lens group 101 is fixed. This corresponds to the movement in the first embodiment shown in FIGS. 10(a) to 10(e).

As shown in FIG. 22, the image pickup lens device 10 is constituted so that the first lens group 101, the second lens group 102 and the third lens group 103 are arranged in this order from the object side with their optical axes matching with each other. The first, the second and the third lens groups 101 to 103 are supported by the supporting members 104 to 106, respectively. The plane parallel plate and the image sensor, now shown, are supported to a fixing member 107 so as to be fixed to the center portion of the fixing member 107. The fixing member 107 is provided to a cellular phone main body, not shown, in a fixed manner. A bar-shaped guide member 108 pierces through the supporting members 104 to 106 of the first, the second and the third lens groups.

A driving unit 20 composed of, for example, an impact type piezoelectric actuator is attached to the supporting member 106 of the third lens group, and the third lens group 103 is driven along the optical axis by the driving device including the driving unit 20 via the supporting member 106. The driving unit 20 is, more concretely, composed of a supporting member 21, a piezoelectric element 22, a driving member 23 and an engagement member 24. The supporting member 21 is fixed to the cellular phone main body, not shown, and holds the piezoelectric element 22 and the driving member 23. The piezoelectric element 22 is provided so that its expansion direction as a polarization direction matches with the axial direction of the supporting member 21. One end of the driving member 23 is fastened to the piezoelectric element 22, and the other end is fastened to a side surface of the engagement member 24. Engagement portions 105a and 106a are provided to suitable positions of the supporting member 105 and the engagement member 24 of the second lens group, respectively.

In the above constitution, when a voltage is applied to the piezoelectric element 22, the piezoelectric element 22 expands or shrinks to the optically axial direction according to a direction of the piezoelectric. The expansion or the shrinkage is transmitted to the engagement member 24 joined to the piezoelectric element 22 via the driving member 23. Since the engagement member 24 is joined to the supporting member 106 of the third lens group, it can move the third lens group 103. At this time, the engagement portions 105a and 106a are engaged with cam members or the like, not shown, so that the second and the third lens groups 102 and 103 can be moved desirably in order to carry out the power variation and focusing or the like. When engagement portions similar to the engagement portions 105a and 106b are provided to the supporting member 104 of the first lens group, the three lens groups can be driven simultaneously, thereby carrying out the power variation and focusing. Further, in the similar constitution, four or more lens groups are provided, the lens groups are driven independently or relatively, so that the power variation and the focusing can be carried out.

In such an image pickup lens device, the light beam which enters from the object side passes through the first, the second and the third lens groups 101 to 103 in this order. The light beam then passes through the plane parallel plate, not shown, arranged to be adjacent to the third lens group 103. At this time, the optical image is corrected so that a so-called loopback noise which is generated when the light beam is converted into an electric signal by the image sensor, is minimized. The plane parallel plate corresponds to an optical low-pass filter, an infrared cut filter, a cover glass of the image sensor and the like. Finally, the optical image of the object is formed on the light receiving surface of the image sensor, not shown, and then the optical image is converted into an electric signal. This electric signal is subject to the predetermined digital image process, image compressing process and the like as the need arises, and is recorded as a digital video signal in a memory of the cellular phone or the personal digital assistant, or is transmitted to another digital device via wire or radio.

A stepping motor or the like may be used in order to drive the lens groups and the optical stop. In another manner, in the case where a moving amount is small or the weight of the lens groups is light, a ultracompact piezoelectric actuator may be used independently for the lens groups. As a result, the lens groups can be driven independently, and also increase in the volume and the power consumption of the driving section is suppressed, and simultaneously the entire image pickup lens device can be more compact.

Concrete examples 1 to 9 of the first to the ninth embodiments are explained more concretely with reference to construction data, the aberration diagrams, and the like.

EXAMPLE 1

The construction data of the lenses in the first embodiment (example 1) are shown in Tables 1 and 2. In this example, all the lenses are made of glass.

TABLE 1

| Lens surface | Curvature radius (mm) | Axial distance (mm) W | M | T | Refractive index | Abbe number |
|---|---|---|---|---|---|---|
| r1* | −53.091 | 0.500 | | | 1.48740 | 70.44 |
| r2 | 4.282 | 0.776 | | | 2.00330 | 28.30 |
| r3* | 4.967 | 3.472 | 1.629 | 0.500 | | |
| r4 | ∞ | 0.100 | | | | |
| r5* | 3.011 | 1.341 | | | 1.84003 | 40.90 |
| r6 | −2.614 | 0.957 | | | 1.69718 | 26.74 |
| r7* | 3.261 | 1.216 | 4.065 | 5.964 | | |
| r8* | −19.420 | 0.862 | | | 2.00330 | 28.30 |
| r9* | −6.076 | 2.275 | 1.270 | 0.500 | | |
| r10 | ∞ | 0.500 | | | 1.51680 | 64.20 |
| r11 | ∞ | 0.500 | | | | |
| r12 | ∞ | | | | | |

TABLE 2

| Lens surface | Conical coefficient | Aspherical surface coefficient A | B | C | D |
|---|---|---|---|---|---|
| r1* | 0 | −2.85E−03 | 2.67E−04 | −6.27E−06 | −2.23E−07 |
| r3* | 0 | −2.69E−03 | 3.03E−04 | −1.34E−08 | −1.94E−06 |
| r5* | 0 | −2.84E−03 | −8.34E−04 | 2.27E−04 | −8.24E−05 |
| r7* | 0 | 1.47E−02 | 2.08E−04 | 8.80E−04 | −1.40E−04 |
| r8* | 0 | 3.14E−03 | −5.37E−04 | 1.46E−05 | 1.28E−06 |
| r9* | 0 | 4.11E−03 | −1.76E−04 | −4.59E−05 | 3.77E−06 |

The Table 1 shows numbers of the lens surfaces, the curvature radius of the surfaces (unit: mm), the distance between the lens surfaces on the optical axis at the wide-angle end (W), the midpoint (M) and the telephoto end (T) (axial distance) (unit: mm), the refractive index of the lenses, and Abbe number from the left side. Blank spaces of the axial distance M and T represent that these values are the same as those in the left column W. The numbers of the lenses ri (i=1, 2, 3, . . . ) are, as shown in FIG. 1, the i-numbered lens surfaces counted from the object side, and the surface where * is added to ri is an aspherical surface. As is clear from Table 1, in the example 1, both end surfaces of the cemented lens composing the first lens group (Gr1) and the second lens group (Gr2) (surfaces facing outside air), and both surfaces of the third lens group (Gr3) (5th lens counted from the object side) are aspherical surfaces. That is to say, all the lens surface which face outside air are aspherical surface. Further, since both surfaces of the optical stop (ST), both surfaces of the plane parallel plate (PL), and the light receiving surface of the image sensor (SR) are plane, their curvature radius is ∞.

The shape of the aspherical surfaces of the lenses is defined by the following expression which uses local orthogonal coordinate system (x, y, z) in which a surface vertex is an original point and a direction from the object to the image sensor is a positive direction of z axis.

$$z = \frac{c \cdot h^2}{1 + SQRT\{1 - (1+k)c^2 \cdot h^2\}} + A \cdot h^4 + B \cdot h^6 + C \cdot h^8 + D \cdot h^{10} + E \cdot h^{12} + F \cdot h^{14} + G \cdot h^{16} + H \cdot h^{18} + J \cdot h^{20}$$

where, z: an amount of displacement to the z-axial direction in the position of height h (on the basis of surface vertex), h: a height to a direction vertical with respect to the z axis ($h^2=x^2+y^2$), c: paraxial curvature (=1/curvature radius), A, B, C, D, E, F, G, H and J: 4th order, 6th order, 8th order, 10th order, 12th order, 14th order, 16th order, 18th order and 20th order aspherical surface coefficients, and k: conical coefficient.

Table 2 shows only the conical coefficient k and the aspherical surface coefficients A, B, C and D, and the other aspherical surface coefficients E, F, G, H and J are 0. As is clear from this formula, the curvature radius with respect to the aspherical surface lens shown in Table 1 represents values near the center of the lenses.

The spherical aberration, the astigmatism and the distortion aberration of the entire optical system in the example 1 (the first, the second and the third lens groups are combined) in the above lens arrangement and constitution are shown in FIGS. 11(a) to 11(i). In these drawings, an upper portion (FIGS. 11(a) to 11(c)) shows the aberration at the wide-angle end (W), a middle portion (FIGS. 11(d) to 11(f)) shows the aberration at the midpoint (M), and a lower portion (FIGS. 11(g) to 11(i)) shows the aberration at the telephoto end (T). An axis of abscissas of the spherical aberration and the astigmatism represents a shift of the focal point position by unit of mm, and an axis of abscissas of the distortion aberration represents a distortion amount by percentage. An axis of ordinates of the spherical aberration is represented by a value standardized by an incident height, but an axis of ordinates of the astigmatism and the distortion aberration is represented by a height (image height) of the image (unit: mm). The drawings of the spherical aberration show the aberration in the case using three light beams with different wavelengths of red shown by a broken line (wavelength: 656.27 nm), yellow shown by a solid line (so-called d line: wavelength of 587.56 nm), and blue shown by an alternate long and two short dashes line (wavelength: 435.83 nm). In the drawings of the astigmatism, reference symbols S and T represent results on a sagittal (radial) plane and a tangential (meridional) plane. The drawings of the astigmatism and the distortion aberration show results when the yellow line (d line) is used. As is clear from FIGS. 11(a) to 11(i), the lens groups in the example 1 show excellent optical properties such that the chromatic aberration and the astigmatism at all the wide-angle end (W), the midpoint (M) and the telephoto end (T) are within approximately 0.1 mm, and the distortion aberration is within approximately 5%. The focal length (unit: mm) at the wide-angle end (W), the midpoint (M) and the telephoto end (T) and the F value in the example 1 are shown in Tables 19 and 20. With reference to these tables, it is found that the bright optical system with short focal point can be realized in the present invention.

EXAMPLE 2

The construction data of the lenses in the second embodiment (example 2) are shown in Tables 3 and 4. As is clear from these tables, in the example 2, the surface of the cemented lens in the first lens group (Gr1) which is the closest to the image, both end surfaces of the cemented lens composing the second lens group (Gr2) (surface facing outside air), and the surface of the third lens group (Gr3) which is the closest to the image are aspherical surfaces. In this example, all the lenses are made of glass.

TABLE 3

| Lens surface | Curvature radius (mm) | Axial distance (mm) W | M | T | Refractive index | Abbe number |
|---|---|---|---|---|---|---|
| r1 | −24.091 | 0.500 | | | 1.68680 | 54.18 |
| r2 | 6.728 | 1.002 | | | 1.84666 | 23.82 |
| r3* | 11.983 | 6.199 | 1.861 | 0.500 | | |
| r4 | ∞ | 0.100 | | | | |
| r5* | 3.277 | 1.356 | | | 1.83069 | 41.75 |
| r6 | −3.644 | 1.045 | | | 1.67700 | 27.94 |
| r7* | 3.082 | 1.678 | 6.732 | 9.771 | | |
| r8 | −38.505 | 1.687 | | | 1.84014 | 40.89 |
| r9 | −5.768 | 0.500 | | | 1.54934 | 43.70 |
| r10* | −6.171 | 2.512 | 1.424 | 0.540 | | |
| r11 | ∞ | 0.500 | | | 1.51680 | 64.20 |
| r12 | ∞ | 0.500 | | | | |
| r13 | ∞ | | | | | |

TABLE 4

| Lens surface | Conical coefficient | Aspherical surface coefficient | | | |
|---|---|---|---|---|---|
| | | A | B | C | D |
| r3* | 0 | −4.67E−04 | 2.43E−05 | −2.99E−06 | 1.28E−07 |
| r5* | 0 | −1.73E−03 | −3.44E−04 | 3.02E−05 | −1.23E−05 |
| r7* | 0 | 9.70E−03 | 3.16E−04 | 3.63E−04 | −5.96E−05 |
| r10* | 0 | 3.37E−03 | −2.16E−04 | 1.30E−05 | −3.62E−07 |

EXAMPLE 3

The construction data of the lenses in the third embodiment (example 3) are shown in Tables 5 and 6. As is clear from these tables, in the example 3, both the end surfaces of the cemented lenses composing the first lens group (Gr1) and the second lens group (Gr2), and both the surfaces of the third lens group (Gr3) (the fifth lens counted from the object side) are aspherical surfaces. That is to say, all the lens surfaces which face outside air are the aspherical surfaces. In this example, all the lenses are made of glass.

TABLE 5

| Lens surface | Curvature radius (mm) | Axial distance (mm) W | M | T | Refractive index | Abbe number |
|---|---|---|---|---|---|---|
| r1* | −12.956 | 0.500 | | | 1.48749 | 70.44 |
| r2 | 5.817 | 0.858 | | | 1.84666 | 23.82 |
| r3* | 7.771 | 5.738 | 1.773 | 0.500 | | |
| r4 | ∞ | 0.100 | | | | |
| r5* | 3.441 | 1.159 | | | 1.85000 | 40.04 |
| r6 | −5.247 | 2.304 | | | 1.76706 | 23.63 |
| r7* | 4.365 | 0.893 | 5.377 | 8.084 | | |
| r8* | −14.074 | 0.996 | | | 1.84932 | 35.15 |
| r9* | −4.955 | 2.453 | 1.341 | 0.500 | | |
| r10 | ∞ | 0.500 | | | 1.51680 | 64.20 |
| r11 | ∞ | 0.500 | | | | |
| r12 | ∞ | | | | | |

TABLE 6

| Lens surface | Conical coefficient | Aspherical surface coefficient | | | |
|---|---|---|---|---|---|
| | | A | B | C | D |
| r1* | 0 | −5.85E−04 | 1.35E−04 | −6.30E−06 | 9.73E−08 |
| r3* | 0 | −1.05E−03 | 1.62E−04 | −5.69E−06 | −1.04E−07 |

TABLE 6-continued

| Lens sur-face | Conical coef-ficient | Aspherical surface coefficient | | | |
|---|---|---|---|---|---|
| | | A | B | C | D |
| r5* | 0 | −1.18E−03 | −3.62E−04 | 2.52E−04 | −7.26E−05 |
| r7* | 0 | 1.12E−02 | 3.73E−04 | 5.44E−04 | −3.79E−05 |
| r8* | 0 | −1.03E−03 | 5.54E−04 | −3.91E−05 | 1.69E−06 |
| r9* | 0 | 1.54E−03 | 3.21E−04 | −2.10E−05 | 1.32E−06 |

EXAMPLE 4

The construction data of the lenses in the fourth embodiment (example 4) are shown in Tables 7 and 8. As is clear from these tables, in the example 4, both the end surfaces of the cemented lenses composing the first lens group (Gr1) and the second lens group (Gr2) (the surfaces facing outside air), and both the surfaces of the third lens group (Gr3) (the fifth lens counted from the object side) and the fourth lens group (Gr4) (the sixth lens counted from the object side) are aspherical surfaces. That is to say, all the lens surfaces facing outside air are aspherical surfaces. In this example, all the lenses are made of glass.

TABLE 7

| Lens surface | Curvature radius (mm) | Axial distance (mm) | | | Refractive index | Abbe number |
|---|---|---|---|---|---|---|
| | | W | M | T | | |
| r1* | −32.721 | 0.500 | | | 1.49753 | 69.00 |
| r2 | 5.552 | 1.002 | | | 1.82724 | 23.33 |
| r3* | 7.107 | 6.770 | 2.219 | 0.500 | | |
| r4 | ∞ | 0.100 | | | | |
| r5* | 2.941 | 1.331 | | | 1.82277 | 42.53 |
| r6 | −3.877 | 0.500 | | | 1.67882 | 27.82 |
| r7* | 2.900 | 1.078 | 5.795 | 8.391 | | |
| r8* | −324.344 | 2.177 | | | 1.80932 | 43.94 |
| r9* | −4.330 | 1.542 | 0.883 | 0.500 | | |
| r10* | −4.048 | 0.500 | | | 1.76509 | 29.04 |
| r11* | −6.894 | 0.500 | | | | |
| r12 | ∞ | 0.500 | | | 1.5168 | 64.20 |
| r13 | ∞ | 0.500 | | | | |
| r14 | ∞ | | | | | |

TABLE 8

| Lens sur-face | Conical coef-ficient | Aspherical surface coefficient | | | |
|---|---|---|---|---|---|
| | | A | B | C | D |
| r1* | 0 | 3.77E−04 | 3.24E−05 | −1.57E−06 | 2.00E−08 |
| r3* | 0 | −2.69E−04 | 1.35E−04 | −6.60E−06 | 7.62E−08 |
| r5* | 0 | −9.52E−04 | −4.37E−04 | 2.17E−04 | −8.55E−05 |
| r7* | 0 | 1.14E−02 | 1.24E−03 | 4.66E−04 | −3.57E−05 |
| r8* | 0 | −2.21E−03 | −1.55E−04 | −1.32E−05 | 5.35E−07 |
| r9* | 0 | 3.29E−03 | −1.07E−04 | −1.11E−05 | 5.89E−07 |
| r10* | 0 | 1.45E−02 | 5.56E−05 | −2.35E−05 | 3.38E−07 |
| r11* | 0 | 7.00E−03 | 4.37E−04 | 5.70E−06 | −3.26E−06 |

EXAMPLE 5

The construction data of the lenses in the fifth embodiment (example 5) are shown in Tables 9 and 10. As is clear from these tables, in the example 5, both the end surfaces (the surfaces facing outside air) of the cemented lenses composing the first lens group (Gr1) and the second lens group (Gr2), and both the surfaces of the third lens group (Gr3) (the fifth lens counted from the object side) are aspherical surfaces. That is to say, all the lens surfaces facing outside air are aspherical surfaces. In this example, the first, the second, the fifth lenses, namely, the first lens group (Gr1) and the third lens group (Gr3) are made of plastic (resin).

TABLE 9

| Lens surface | Curvature radius (mm) | Axial distance (mm) | | | Refractive index | Abbe number |
|---|---|---|---|---|---|---|
| | | W | M | T | | |
| r1* | −9.056 | 0.800 | | | 1.53048 | 55.72 |
| r2 | 6.929 | 1.910 | | | 1.58340 | 30.23 |
| r3* | 28.038 | 8.314 | 3.200 | 1.400 | | |
| r4 | ∞ | 0.100 | | | | |
| r5* | 3.171 | 1.342 | | | 1.85335 | 39.62 |
| r6 | −6.828 | 1.183 | | | 1.72284 | 25.43 |
| r7* | 2.898 | 1.400 | 6.705 | 9.840 | | |
| r8* | 45.880 | 1.926 | | | 1.53048 | 55.72 |
| r9* | −4.449 | 2.525 | 1.596 | 1.000 | | |
| r10 | ∞ | 0.500 | | | 1.51680 | 64.20 |
| r11 | ∞ | 0.500 | | | | |
| r12 | ∞ | | | | | |

TABLE 10

| Lens surface | Conical coef-ficient | Aspherical surface coefficient | | | |
|---|---|---|---|---|---|
| | | A | B | C | D |
| r1* | 0 | 1.23E−03 | −4.90E−05 | 2.20E−06 | −4.13E−08 |
| r3* | 0 | 2.00E−04 | −4.12E−05 | 4.99E−06 | −1.92E−07 |
| r5* | 0 | −8.17E−04 | −3.70E−04 | 2.12E−04 | −6.70E−05 |
| r7* | 0 | 1.04E−02 | 9.21E−04 | 5.27E−04 | −1.10E−04 |
| r8* | 0 | 1.06E−03 | −1.34E−04 | 1.23E−05 | −9.04E−08 |
| r9* | 0 | 6.05E−03 | −3.84E−04 | 2.29E−05 | −2.40E−08 |

EXAMPLE 6

The construction data of the lenses in the sixth embodiment (example 6) are shown in Tables 11 and 12. As is clear from these tables, in the example 6, both the end surfaces (the surfaces facing outside air) of the cemented lenses composing the first lens group (Gr1) and the second lens group (Gr2), and both surfaces of the third lens group (Gr3) (the fifth lens counted from the object side) are aspherical surfaces. That is to say, all the lens surfaces facing outside air are aspherical lenses. In this example, the first, the second and the sixth lenses, namely, the first lens group (Gr1) and the third lens group (Gr3) are plastic lenses.

TABLE 11

| Lens surface | Curvature radius (mm) | Axial distance (mm) | | | Refractive index | Abbe number |
|---|---|---|---|---|---|---|
| | | W | M | T | | |
| r1* | 149.414 | 0.800 | | | 1.53048 | 55.72 |
| r2 | 4.751 | 1.774 | | | 1.58340 | 30.23 |
| r3* | 5.918 | 7.456 | 3.288 | 1.400 | | |
| r4 | ∞ | 0.100 | | | | |
| r5* | 3.460 | 1.375 | | | 1.85000 | 40.04 |
| r6 | −4.314 | 0.800 | | | 1.68323 | 27.55 |
| r7 | 3.000 | 0.800 | | | 1.85000 | 40.04 |
| r8* | 2.948 | 1.400 | 6.003 | 8.608 | | |
| r9* | −37.319 | 1.843 | | | 1.53048 | 55.72 |
| r10* | −3.730 | 2.152 | 1.086 | 1.000 | | |

TABLE 11-continued

| Lens surface | Curvature radius (mm) | Axial distance (mm) W | M | T | Refractive index | Abbe number |
|---|---|---|---|---|---|---|
| r11 | ∞ | 0.500 | | | 1.51680 | 64.20 |
| r12 | ∞ | 0.500 | | | | |
| r13 | ∞ | | | | | |

TABLE 12

| Lens surface | Conical coefficient | Aspherical surface coefficient A | B | C | D |
|---|---|---|---|---|---|
| r1* | 0 | −1.74E−03 | 6.92E−05 | −9.75E−07 | −1.46E−09 |
| r3* | 0 | −3.17E−03 | 9.81E−05 | 2.11E−06 | −2.23E−07 |
| r5* | 0 | −1.82E−03 | 3.75E−05 | −1.25E−04 | 2.05E−05 |
| r8* | 0 | 9.04E−02 | −4.14E−05 | 7.80E−04 | −1.49E−04 |
| r9* | 0 | −3.17E−03 | 5.13E−06 | 5.32E−05 | −2.31E−06 |
| r10* | 0 | 2.73E−03 | −1.85E−04 | 4.40E−05 | 0.00E+00 |

EXAMPLE 7

The construction data of the lenses in the seventh embodiment (example 7) are shown in Tables 13 and 14. As is clear from these tables, in the example 7, both the end surfaces (the surfaces facing outside air) of the cemented lenses of the first lens group (Gr1) and the second lens group (Gr2), and both the surfaces of the third lens group (Gr3) (the fifth lens counted from the object side) are spherical surfaces. That is to say, all the lens surfaces which face outside air are aspherical surfaces. In this example, all the composing lenses are made of glass.

TABLE 13

| Lens surface | Curvature radius (mm) | Axial distance (mm) W | M | T | Refractive index | Abbe number |
|---|---|---|---|---|---|---|
| r1* | −12.161 | 1.000 | | | 1.51789 | 66.41 |
| r2 | 4.411 | 1.363 | | | 1.84758 | 26.84 |
| r3* | 6.016 | 3.087 | 1.128 | 0.500 | | |
| r4 | ∞ | 0.100 | | | | |
| r5* | 3.174 | 1.000 | | | 1.84677 | 40.31 |
| r6 | −4.263 | 1.500 | | | 1.72179 | 25.48 |
| r7* | 3.797 | 2.151 | 8.448 | 11.956 | | |
| r8* | −459.484 | 1.061 | | | 1.85000 | 40.04 |
| r9* | −6.406 | 2.653 | 1.472 | 0.519 | | |
| r10 | ∞ | 0.500 | | | 1.51680 | 64.20 |
| r11 | ∞ | 0.500 | | | | |
| r12 | ∞ | | | | | |

TABLE 14

| Lens surface | Conical coefficient | Aspherical surface coefficient A | B | C | D |
|---|---|---|---|---|---|
| r1* | 0 | 4.62E−05 | 7.80E−05 | −5.72E−06 | 1.91E−07 |
| r3* | 0 | −1.10E−03 | 2.68E−04 | −4.46E−05 | 4.03E−06 |
| r5* | 0 | −2.20E−03 | −2.44E−05 | −4.77E−05 | 2.84E−06 |
| r7* | 0 | 1.00E−02 | 1.11E−03 | 5.18E−05 | 7.65E−05 |
| r8* | 0 | −5.70E−04 | −1.33E−04 | 3.94E−05 | −2.08E−06 |
| r9* | 0 | 1.38E−03 | −2.60E−04 | 4.97E−05 | −2.38E−06 |

EXAMPLE 8

The construction data of the lenses in the eighth embodiment (example 8) are shown in Tables 15 and 16. As is clear from these tables, in the example 8, both the surfaces of the lens on the image side (the second lens counted from the object side) in the first lens group (Gr1), both end surfaces (the surface facing outside air) of the cemented lens composing the second lens group (Gr2), and both the surfaces of the third lens group (Gr3) (the fifth lens counted from the object side) and the fourth lens group (Gr4) (the sixth lens counted from the object side) are aspherical surfaces. In this example, all the lenses are made of glass.

TABLE 15

| Lens surface | Curvature radius (mm) | Axial distance (mm) W | M | T | Refractive index | Abbe number |
|---|---|---|---|---|---|---|
| r1 | 30.361 | 0.500 | | | 1.54591 | 63.42 |
| r2 | 4.331 | 0.555 | | | | |
| r3* | 4.477 | 1.057 | | | 1.84731 | 25.88 |
| r4* | 4.957 | 6.275 | 2.068 | 0.500 | | |
| r5 | ∞ | 0.100 | | | | |
| r6* | 2.906 | 1.362 | | | 1.82406 | 42.40 |
| r7 | −3.454 | 0.575 | | | 1.67604 | 28.15 |
| r8* | 2.889 | 0.706 | 5.175 | 7.674 | | |
| r9* | −30.130 | 2.177 | | | 1.75464 | 51.55 |
| r10* | −4.052 | 1.694 | 0.931 | 0.500 | | |
| r11* | −3.773 | 0.500 | | | 1.85000 | 40.04 |
| r12* | −4.703 | 0.500 | | | | |
| r13 | ∞ | 0.500 | | | 1.51680 | 64.20 |
| r14 | ∞ | 0.500 | | | | |
| r15 | ∞ | | | | | |

TABLE 16

| Lens surface | Conical coefficient | Aspherical surface coefficient A | B | C | D |
|---|---|---|---|---|---|
| r3* | 0 | −5.05E−04 | 2.52E−06 | 4.19E−07 | −7.48E−08 |
| r4* | 0 | −1.29E−03 | 7.91E−05 | −7.14E−06 | 1.41E−07 |
| r6* | 0 | −1.23E−03 | −5.92E−04 | 3.23E−04 | −1.40E−04 |
| r8* | 0 | 1.32E−02 | 9.80E−04 | 1.11E−03 | −2.41E−04 |
| r9* | 0 | −2.95E−03 | −3.05E−04 | −2.85E−05 | 1.69E−07 |
| r10* | 0 | 3.81E−03 | −1.92E−04 | −1.33E−05 | 5.66E−07 |
| r11* | 0 | 1.71E−02 | 2.31E−04 | −4.54E−05 | 1.52E−06 |
| r12* | 0 | 1.16E−02 | 3.31E−04 | 2.25E−05 | −4.28E−06 |

EXAMPLE 9

The construction data of the lenses in the ninth embodiment (example 9) are shown in Tables 17 and 18. As is clear from the tables, in the example 9, the surface on the object side of the cemented lens in the first lens group (Gr1), both the end surfaces (the surfaces facing outside air) of the cemented lens composing the second lens group (Gr2), and both the surfaces of the third lens group (Gr3) (the sixth lenses counted from the object side) are aspherical surfaces. In this example, all the lenses are made of glass.

TABLE 17

| Lens surface | Curvature radius (mm) | Axial distance (mm) W | Axial distance (mm) M | Axial distance (mm) T | Refractive index | Abbe number |
|---|---|---|---|---|---|---|
| r1* | −20.497 | 0.500 | | | 1.48749 | 70.44 |
| r2 | 7.534 | 1.161 | | | 1.84826 | 29.57 |
| r3 | 16.284 | 0.827 | | | | |
| r4 | −17.410 | 0.500 | | | 1.51963 | 66.21 |
| r5 | 35.502 | 6.977 | 2.115 | 0.500 | | |
| r6 | ∞ | 0.100 | | | | |
| r7* | 3.823 | 1.259 | | | 1.84525 | 40.44 |
| r8 | −4.578 | 2.233 | | | 1.73420 | 25.58 |
| r9* | 4.070 | 1.987 | 6.759 | 9.702 | | |
| r10* | −40.781 | 1.121 | | | 1.84936 | 35.44 |
| r11* | −5.920 | 2.335 | 1.396 | 0.748 | | |
| r12 | ∞ | 0.500 | | | 1.51680 | 64.20 |
| r13 | ∞ | 0.500 | | | | |
| r14 | ∞ | | | | | |

TABLE 18

| Lens surface | Conical coefficient | Aspherical surface coefficient A | B | C | D |
|---|---|---|---|---|---|
| r1* | 0 | 3.45E−04 | −2.06E−06 | 3.97E−08 | −6.50E−10 |
| r7* | 0 | −1.05E−03 | −1.11E−04 | 1.63E−05 | −4.92E−06 |
| r9* | 0 | 7.73E−03 | 3.71E−04 | 1.87E−04 | −1.02E−05 |
| r10* | 0 | −1.41E−03 | 3.80E−04 | −3.05E−05 | 1.30E−06 |
| r11* | 0 | 4.78E−04 | 3.16E−04 | −3.03E−05 | 1.42E−06 |

The spherical aberration, the astigmatism, and the distortion aberration of the entire optical systems in the examples 2 to 9 (the first, the second and the third lens groups are combined. In the examples 4 to 8, these three lens groups and the fourth lens group are combined) in the above arrangements and constitutions of the lenses are shown in FIGS. 12 to 19.

All the lens groups in all the examples show excellent optical properties such that the chromatic aberration and the astigmatism at the wide-angle end (W), the midpoint (M) and the telephoto end (T) are within approximately 0.1 mm, and the distortion aberration is within approximately 5%. Further, the focal length (unit: mm) and the F value at the wide-angle end (W), the midpoint (M) and the telephoto end (T) in the examples 2 to 9 are shown in Tables 19 and 20. From these tables, similarly to the example 1, the bright optical system with short focal point can be realized.

The values of the conditional expression (1) to (16) obtained in the examples 1 to 9 are shown in Tables 21 and 22. In any examples, the above-mentioned desirable values can be obtained according to the conditional expressions.

TABLE 19

| | Focal length (mm) | | |
|---|---|---|---|
| | W | M | T |
| Example 1 | 4.7 | 7.1 | 9.4 |
| Example 2 | 4.9 | 9.7 | 13.8 |
| Example 3 | 4.5 | 9.0 | 12.7 |
| Example 4 | 4.2 | 8.3 | 11.9 |

TABLE 19-continued

| | Focal length (mm) | | |
|---|---|---|---|
| | W | M | T |
| Example 5 | 4.3 | 8.5 | 12.2 |
| Example 6 | 4.5 | 9.0 | 12.8 |
| Example 7 | 5.2 | 10.4 | 14.7 |
| Example 8 | 4.0 | 8.0 | 11.3 |

TABLE 20

| | F value | | |
|---|---|---|---|
| | W | M | T |
| Example 1 | 2.8 | 3.7 | 4.5 |
| Example 2 | 2.8 | 4.4 | 5.7 |
| Example 3 | 2.8 | 4.3 | 5.6 |
| Example 4 | 2.8 | 4.4 | 5.6 |
| Example 5 | 3.0 | 4.7 | 6.0 |
| Example 6 | 3.0 | 4.7 | 5.9 |
| Example 7 | 2.8 | 4.7 | 6.3 |
| Example 8 | 2.8 | 4.4 | 5.5 |

TABLE 21

| | Example 1 | Example 2 | Example 3 | Example 4 |
|---|---|---|---|---|
| (1) | 0.61 | 0.80 | 0.68 | 1.28 |
| (2) | 1.11 | 1.38 | 1.30 | 1.66 |
| (3) | 42.1 | 30.4 | 46.6 | 45.7 |
| (4) | 2.57 | 2.71 | 2.65 | 3.44 |
| (5) | 0.41 | 0.46 | 0.36 | 0.40 |
| (6) | 0.55 | 0.49 | 0.46 | 0.58 |
| (7) | 0.26 | 0.18 | 0.20 | 0.19 |
| (8) | 0.38 | 0.28 | 0.28 | 0.25 |
| (9) | 0.75 | 0.77 | 0.80 | 0.70 |
| (10) | 14.2 | 13.8 | 16.4 | 14.7 |
| (11) | 1.04 | 1.02 | 1.08 | 1.06 |
| (12) | 1.29 | 0.95 | 0.93 | 1.21 |
| (13) | 23.5 | 16.4 | 22.7 | 24.9 |
| (14) | 17.8 | 18.8 | 22.0 | 22.8 |
| (15) | 0.52 | 0.30 | 0.36 | 0.33 |
| (16) | 2.003 | 1.847 | 1.850 | 1.827 |

TABLE 22

| | Example 5 | Example 6 | Example 7 | Example 8 |
|---|---|---|---|---|
| (1) | 0.97 | 0.83 | 0.74 | 1.05 |
| (2) | 1.77 | 1.41 | 1.09 | 1.58 |
| (3) | 25.5 | 25.5 | 39.6 | 37.5 |
| (4) | 3.18 | 2.70 | 1.80 | 3.17 |
| (5) | 0.48 | 0.35 | 0.44 | 0.34 |
| (6) | 0.62 | 0.50 | 0.38 | 0.56 |
| (7) | 0.15 | 0.15 | 0.16 | 0.19 |
| (8) | 0.21 | 0.23 | 0.35 | 0.23 |
| (9) | 0.59 | 0.66 | 0.74 | 0.67 |
| (10) | 14.2 | — | 14.8 | 14.2 |
| (11) | 0.99 | — | 1.13 | 1.06 |
| (12) | 1.12 | 0.95 | 0.63 | 1.12 |
| (13) | 16.8 | 16.6 | 15.6 | 24.9 |
| (14) | 20.1 | 16.2 | 21.8 | 23.8 |
| (15) | 0.32 | 0.32 | 0.33 | 0.30 |
| (16) | 1.853 | 1.850 | 1.850 | 1.850 |

As explained above, the glass lenses are mainly used in the examples, and the glass lenses and the plastic lenses (resin lens) are also used in the examples 5 and 6. The present invention, however, is not limited to this, and any one of the lens groups or two or more lens groups can be a plastic lens. Particularly, since the first lens group (Gr1) has a larger lens diameter than the other lens groups, the plastic lens can produce the greatest weight saving effect. In the variable power optical system of the present invention, a moving amount of the second lens group (Gr2) is the largest, but when the second lens group (Gr2) is made of plastic, a load on the lens driving device can be reduced. Since the optical power of the third lens group (Gr3) or the fourth lens group (Gr4) is weaker than the other lens groups, the satisfactory aberration correction can be made and simultaneously the lens group can be made of plastic. In any cases, when the plastic lens is used, the lens driving device can be compact, and thus the entire image pickup lens device including the lens groups and the lens driving devices can be more compact.

Since the image pickup lens device into which the variable power optical system of the present invention is incorporated is small and light, it can be installed into the digital devices such as cellular phones. As a result, a still image or a moving image can be photographed with a desired zoom-in power. Further, since the image pickup lens device has high optical performance which can cope with a high-pixel image sensor of 2000000 or more pixels, it has high superiority with respect to an electronic zoom system which requires interpolation.

Although the present invention has been fully described by way of examples with reference to the accompanying drawings, it is to be noted that various changes and modifications will be apparent to those skilled in the art. Therefore, unless such changes and modification depart from the scope of the present invention, they should be construed as being included therein.

What is claimed is:

1. A variable power optical system, that forms an optical image of an object on a light receiving surface of an image sensor for converting an optical image into an electric signal and changing gaps between lens groups in an optically axial direction so as to vary power of the optical system, the optical system including from an object side:
   a first lens group having negative optical power;
   a second lens group having positive optical power; and
   a third lens group having a positive optical power, wherein when the power of the optical system is varied from a wide-angle end to a telephoto end, a gap between the first lens group and the second lens group is narrowed, the first lens group is composed of two or more lenses, at least three lens groups are composed only a single lens or a lens where countered lens surfaces in the lens group are in close contact with each other without providing a gap; and
   wherein a gap between the second lens group and the third lens group is widened when the power of the optical system is varied from the wide-angle end to the telephoto end.

2. A variable power optical system, that forms an optical image of an object on a light receiving surface of an image sensor for converting an optical image into an electric signal and changing gaps between lens groups in an optically axial direction so as to vary power of the optical system, the optical system from an object side consists of a first lens group, a second lens group and a third lens group, wherein
   the first lens group having negative optical power;
   the second lens group having positive optical power; and
   wherein when the power of the optical system is varied from a wide-angle end to a telephoto end, a gap between the first lens group and the second lens group is narrowed, the first lens group is composed of two or more lenses, said first, second and third lens groups are composed only a single lens or a lens where countered lens surfaces in the lens group are in close contact with each other without providing a gap.

3. A variable power optical system, that forms an optical image of an object on a light receiving surface of an image sensor for converting an optical image into an electric signal and changing gaps between lens groups in an optically axial direction so as to vary power of the optical system, the optical system including from an object side:
   a first lens group having negative optical power;
   a second lens group having positive optical power;
   a third lens group, wherein when the power of the optical system is varied from a wide-angle end to a telephoto end, a gap between the first lens group and the second lens group is narrowed, the first lens group is composed of two or more lenses, at least three lens groups are composed only a single lens or a lens where countered lens surfaces in the lens group are in close contact with each other without providing a gap; and
   an optical stop arranged between the first lens group and the second lens group, wherein the optical stop is moved together with the second lens group when the power of the optical system is varied from the wide-angle end to the telephoto end.

4. A variable power optical system, that forms an optical image of an object on a light receiving surface of an image sensor for converting an optical image into an electric signal and changing gaps between lens groups in an optically axial direction so as to vary power of the optical system, the optical system including from an object side:
   a first lens group having negative optical power;
   a second lens group having positive optical power; and
   a third lens group having a positive power, wherein when the power is varied from a wide-angle end to a telephoto end, a gap between the first lens group and the second lens group is narrowed, the first lens group is composed of two or more lenses, at least three lens groups are composed of a single lens or a lens where adjacent lenses in each lens group are integrated with each other in a fixed manner; and
   wherein a gap between the second lens group and the third lens group is widened when the power of the optical system is varied from the wide-angle end to the telephoto end.

5. A variable power optical system according to claim 4, wherein the third lens group consists of one or two lens.

6. A variable power optical system according to claim 4, wherein all lens surfaces having an interface with air are aspherical.

7. A variable power optical system according to claim 4, wherein the optical system consists of three lens groups.

8. A variable power optical system according to claim 4, wherein the first lens group consists of a cemented lens.

9. A variable power optical system according to claim 4, wherein the second lens group comprises at least one positive lens and at least one negative lens.

10. A variable power optical system according to claim 4, wherein the optical system satisfies the following conditional expression: $0.7<f_2/f_w<2$ where, $f_2$: total focal length of the second lens group, $f_w$: total focal length of the entire optical system at the wide-angle end.

11. A variable power optical system according to claim 4, wherein the first lens group consists of, from an object side, a negative lens and a positive lens element, and wherein the optical system satisfies the following conditional expression:

$|v_{1n}-v_{1p}|>15$ where, $v_{1n}$: Abbe number of the negative lens, and $v_{1p}$: Abbe number of the positive lens.

12. A variable power optical system according to claim 4, wherein the optical system satisfies the following conditional expression: $1<|f_1/f_w|<4$ where, $f_1$: total focal length of the first lens group, and $f_w$: total focal length of the entire optical system at the wide-angle end.

13. A variable power optical system according to claim 4, further comprising an optical stop arranged between the first lens group and the second lens group, wherein the optical stop is moved together with the second lens group when the power of the optical system is varied from the wide-angle end to the telephoto end.

14. A variable power optical system, that forms an optical image of an object on a light receiving surface of an image sensor for converting an optical image into an electric signal and changing gaps between lens groups in an optically axial direction so as to vary power of the optical system, the optical system including from an object side:

a first lens group having negative optical power;

a second lens group having positive optical power;

a third lens group, wherein when the power of the optical system is varied from a wide-angle end to a telephoto end, a gap between the first lens group and the second lens group is narrowed, the first lens group is composed of two or more lenses, at least three lens groups are composed of a single lens or a lens where adjacent lenses in each lens group are integrated with each other in a fixed manner; and an optical stop arranged between the first lens group and the second lens group, wherein the optical stop is moved together with the second lens group when the power of the optical system is varied from the wide-angle end to the telephoto end.

15. A variable power optical system according to claim 14, wherein the third lens group has a positive optical power.

16. A variable power optical system according to claim 14, wherein the third lens group consists of one or two lens.

17. A variable power optical system according to claim 14, wherein all lens surfaces having an interface with air are aspherical.

18. A variable power optical system according to claim 14, wherein a gap between the second lens group and the third lens group is widened when the power of the optical system is varied from the wide-angle end to the telephoto end.

19. A variable power optical system according to claim 14, wherein the optical system consists of three lens groups.

20. A variable power optical system according to claim 14, wherein the first lens group consists of a cemented lens.

21. A variable power optical system according to claim 14, wherein the second lens group comprises at least one positive lens and at least one negative lens.

22. A variable power optical system according to claim 14, wherein the optical system satisfies the following conditional expression: $0.7<f_2/f_w<2$ where, $f_2$: total focal length of the second lens group, $f_w$: total focal length of the entire optical system at the wide-angle end.

23. A variable power optical system according to claim 14, wherein the first lens group consists of, from an object side, a negative lens and a positive lens element, and wherein the optical system satisfies the following conditional expression:

$|v_{1n}-v_{1p}|>15$ where, $v_{1n}$: Abbe number of the negative lens, and $v_{1p}$: Abbe number of the positive lens.

24. A variable power optical system according to claim 14, wherein the optical system satisfies the following conditional expression: $1<|f_1/f_w|<4$ where, $f_1$: total focal length of the first lens group, and $f_w$: total focal length of the entire optical system at the wide-angle end.

25. A variable power optical system, that forms an optical image of an object on a light receiving surface of an image sensor for converting an optical image into an electric signal and changing gaps between lens groups in an optically axial direction so as to vary power of the optical system, the optical system including from an object side:

a first lens group having negative optical power;

a second lens group having positive optical power;

a third lens group, wherein when the power of the optical system is varied from a wide-angle end to a telephoto end, a gap between the first lens group and the second lens group is narrowed, the first lens group is composed of two or more lenses, at least three lens groups are composed of a single lens or a lens where adjacent lenses in each lens group are integrated with each other in a fixed manner; and an optical stop arranged between the first lens group and the second lens group, wherein the optical stop is moved independently from the first and second lens groups when the power of the optical system is varied from the wide-angle end to the telephoto end.

* * * * *

UNITED STATES PATENT AND TRADEMARK OFFICE
CERTIFICATE OF CORRECTION

PATENT NO. : 7,173,771 B2
APPLICATION NO. : 11/130495
DATED : February 6, 2007
INVENTOR(S) : Keiji Matsusaka It is certified that error appears in the above-identified patent and that said Letters Patent is hereby corrected as shown below:

On the Title Page

In column 1, item (54), after "IMAGE PICKUP LENS" delete "DEVICE," and substitute --DEVICES,-- in its place.

In the Specification Line 1

In column 1, in the title, after "IMAGE PICKUP LENS" delete "DEVICE," and substitute --DEVICES,-- in its place.

In the Claims

Column 34, in claim 23, line 6, delete "$|V_{1n} - V_{1p} > 15$" and substitute --$|V_{1n} - V_{1p}| > 15$-- in its place.

Signed and Sealed this

Twenty-second Day of May, 2007

JON W. DUDAS
*Director of the United States Patent and Trademark Office*